(12) United States Patent
Lapinski et al.

(10) Patent No.: US 11,785,405 B2
(45) Date of Patent: Oct. 10, 2023

(54) SYSTEMS AND METHODS FOR AUTOMATIC SYNCHRONIZATION OF CONTENT BETWEEN A PLAYER SYSTEM AND A LISTENER SYSTEM

(71) Applicant: SonixIO, Inc, Los Angeles, CA (US)

(72) Inventors: Michael Lapinski, San Francisco, CA (US); Edward Lang, Denver, CO (US); Damian Krawcewicz, Gdynia (PL); Bahram Nour-Omid, Los Angeles, CA (US)

(73) Assignee: SonixIO, Inc., Los Angeles, CA (US)

( * ) Notice: Subject to any disclaimer, the term of this patent is extended or adjusted under 35 U.S.C. 154(b) by 0 days.

(21) Appl. No.: 17/476,882

(22) Filed: Sep. 16, 2021

(65) Prior Publication Data

US 2022/0007123 A1   Jan. 6, 2022

Related U.S. Application Data

(62) Division of application No. 16/711,268, filed on Dec. 11, 2019, now Pat. No. 11,343,629.

(60) Provisional application No. 62/778,285, filed on Dec. 11, 2018.

(51) Int. Cl.
*H04R 29/00* (2006.01)
*G10L 19/16* (2013.01)
*G10L 25/51* (2013.01)

(52) U.S. Cl.
CPC .......... *H04R 29/004* (2013.01); *G10L 19/167* (2013.01); *G10L 25/51* (2013.01)

(58) Field of Classification Search
None
See application file for complete search history.

(56) References Cited

U.S. PATENT DOCUMENTS

2018/0278984 A1* 9/2018 Aimone ............ H04N 21/4788
2020/0020328 A1   1/2020 Gordon et al.

* cited by examiner

*Primary Examiner* — Kenny H Truong
(74) *Attorney, Agent, or Firm* — Finnegan, Henderson, Farabow, Garrett & Dunner, LLP

(57) ABSTRACT

The present disclosure relates to systems and methods for synchronizing devices using audio signals. Additionally, the present disclosure relates to systems and methods for synchronizing a device to a live event using audio signals. The systems and methods of the present disclosure may provide more accurate and efficient synchronization.

1 Claim, 22 Drawing Sheets

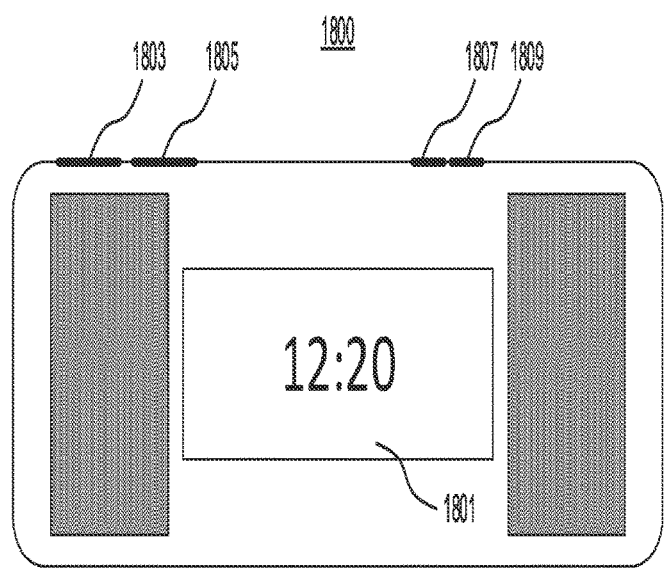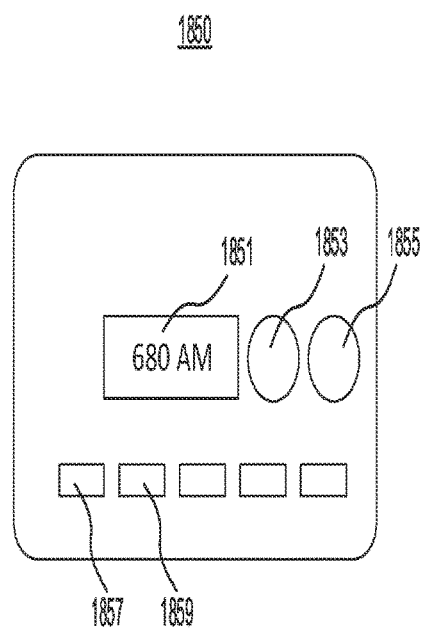
*FIG. 18A*      *FIG. 18B*

SYSTEMS AND METHODS FOR AUTOMATIC SYNCHRONIZATION OF CONTENT BETWEEN A PLAYER SYSTEM AND A LISTENER SYSTEM

CROSS REFERENCE TO RELATED APPLICATIONS

This application is a divisional of application Ser. No. 16/711,268, filed on Dec. 11, 2019, which claims the benefit of priority of U.S. Provisional Patent Application No. 62/778,285, filed on Dec. 11, 2018, both of which are expressly incorporated herein by reference in their entireties.

TECHNICAL FIELD

This disclosure relates generally to temporal synchronization of multiple devices. More specifically, and without limitation, this disclosure relates to systems and methods for synchronizing a first device playing content with a second device listening to content.

BACKGROUND

Dial testing is a technique used to gauge audience reaction to content as the content plays. The content may be audio content, video content, or a combination thereof. In conventional dial testing, researchers may gather in a single location and use a mechanical device to input reactions as the content plays on a centralized screen, centralized speakers, or the like.

In order to improve users' experiences with dial testing, techniques using mobile phones and other user devices may be used in lieu of centralized devices. However, such techniques are generally limited to a single device. For example, a single device may play a video or audio clip and simultaneously present a dial to the user for input. However, this does not allow for the use a larger screen or louder speakers on a second device, which would improve the user's experience and feedback regarding the content.

SUMMARY

As explained above, extant dial testing techniques do not generally allow for the use of two devices for playing content and receiving input related to the content. Moreover, extant techniques for on-demand polling generally use costly computing techniques to synchronize the input to the event, e.g., using backend timing adjustments or video synchronization. The disclosed systems and methods use audio tones to synchronize the content and the input, thereby reducing computing power required for synchronization. Moreover, the audio tones may be unobtrusive and allow for two devices to be used for dial testing, thereby improving users' experiences. Thus, a technical feature of audio tone matching is used to provide technical improvements over conventional dial testing and to provide increased user satisfaction.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the disclosed principles. In the drawings:

FIG. 18A is a depiction of another exemplary device for use as a content device, according to some embodiments of the present disclosure.

FIG. 18B is a depiction of an alternative embodiment of the exemplary device of FIG. 18A, according to some embodiments of the present disclosure.

DETAILED DESCRIPTION

The disclosed embodiments relate to systems and methods for temporal synchronization of multiple devices. Advantageously, embodiments of the present disclosure may allow for more accurate and more power-efficient synchronization of one device broadcasting content to another device capturing input. Additionally, the disclosed embodiments relate to systems and methods for temporal synchronization of a device to live content. Advantageously, embodiments of the present disclosure may allow for more accurate and more power-efficient synchronization of a device capturing input to a live event. Moreover, embodiments of the present disclosure may allow for the synchronization to occur on-the-fly, rather than in advance by the content creator and/or distributor, resulting in greater flexibility than conventional systems.

Reference will now be made in detail to exemplary embodiments and aspects of the present disclosure, examples of which are illustrated in the accompanying drawings.

Figure 1A:
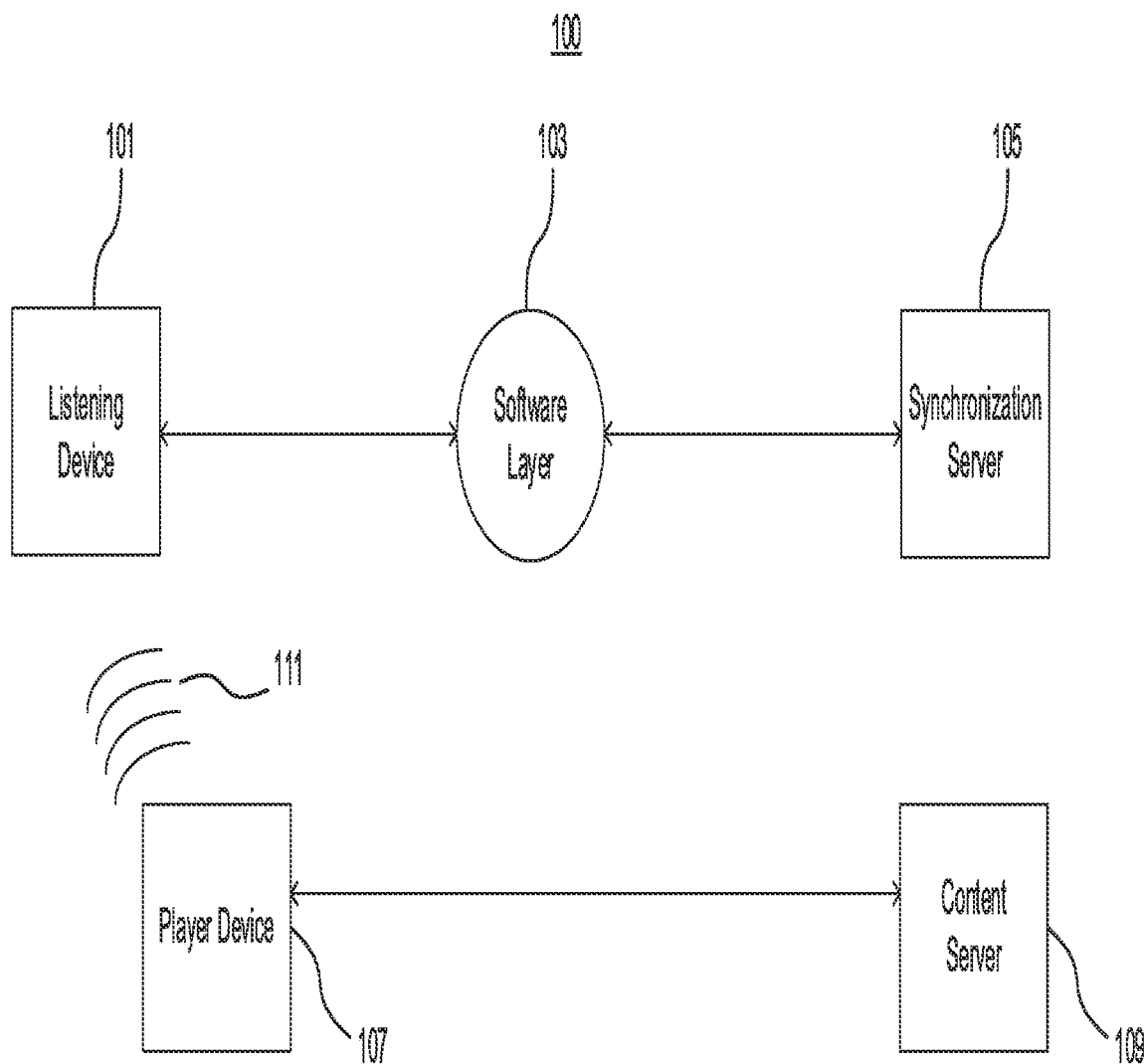
FIG. 1A is a depiction of an exemplary two-device system for dial testing, according to some embodiments of the present disclosure.

FIG. 1A is a depiction of an exemplary two-device system 100 for dial testing. As depicted in FIG. 1A, a listening device 103 may receive audio 111 from a player device 107. For example, listening device 103 may comprise device 1600 of FIGS. 16A and 16B (such as a smartphone or tablet), a desktop computer, a laptop computer, or any other device including an audio sensor to capture audio 111. The audio sensor may comprise a microphone or any other device that converts sound into an electrical signal (e.g., an analog signal or a digital signal). Player device 107 may comprise television 1700 of FIG. 17, radio 1800 of FIG. 18A, radio 1850 of FIG. 18B, or any other device including a speaker to transmit audio for reception by listening device 103. The speaker may comprise a dynamic speaker, a piezoelectric speaker, a magnetostrictive speaker, or any other device that converts an electrical audio signal into corresponding sound waves.

As further depicted in FIG. 1A, listening device 101 may communicate with a synchronization server 105. Synchronization server 105 may comprise server 1900 of FIG. 19 or any other computing device remote from listening device 101. Although not depicted in FIG. 1A, listening device 101 may communicate with synchronization server 105 over one or more computer networks (e.g., the Internet, a local area network (LAN), or the like) using one or more standards and/or protocols (e.g., code-division multiple access (CDMA), global system for mobile communications (GSM), 4G, a long term evolution (LTE), WiFi, Bluetooth®, or the like).

In some embodiments, listening device 101 may use a software layer 103 (coupled to a network interface controller (NIC)) to communicate with synchronization server. For example, software layer 103 may comprise one or more applications (or "apps") executed by at least one processor of listening device 101. The one or more apps may be configured to send packets of information to and receive packets of information from synchronization server 105. Additionally or alternatively, software layer 103 may comprise one or more shared libraries (e.g., a dynamic-link library (DLL) file, an executable and linkable format (ELF) file, a portable executable (PE) file, or the like). The shared libraries may provide functions for communicating with synchronization server 105, functions for standardizing information before sending to synchronization server 105, functions for transforming information from synchronization server 105 into proper format for execution by hardware of listening device 101, or the like.

As further depicted in FIG. 1A, a content server 109 may provide content to player device 107. For example, content server 109 may transmit packets comprising content (which may include audio, video, or a combination thereof) to player device 107 over one or more computer networks (e.g., the Internet, a local area network (LAN), or the like) using one or more standards and/or protocols (e.g., code-division multiple access (CDMA), global system for mobile communications (GSM), 4G, a long term evolution (LTE), WiFi, Bluetooth®, or the like). Additionally or alternatively, player device 107 may receive content using electromagnetic waves (e.g., digital television waves, radio waves, or the like) and/or using wired signals (e.g., electrical signals, optical signals, or the like) via a coaxial cable, a fiber-optic cable, or the like.

System 100 may allow for listening device 101 to synchronize input from a user of the device to audio 111 from player device 107. For example, software layer 103 may include one or more functions and/or data structures allowing listening device 101 to identify audio tones in audio 111 for synchronization of the collected input, as explained further below. In some embodiments, the audio tones may have been embedded in the content by content server 109 and/or by a creator of the content. Additionally or alternatively, one or more audio tones may be dynamically added by player device 107.

As used herein, the term "embed" may refer to embedding that occurs during encoding (e.g., by adding raw data comprising the audio tones to an audio stream prior to encoding using one or more formats, such as a Moving Picture Experts Group (MPEG) standard format like MP3, free lossless audio codec (FLAC), advanced audio coding (AAC), or the like). Additionally or alternatively, the term "embed" may refer to embedding that occurs after encoding (e.g., by encoding the audio tones into the same format as the content and adding a new layer or channel that ties the encoded audio tones to the encoded content or by encoding the audio tones into a separate file and indexing the separate file to a particular timestamp in the encoded content).

Figure 1B:
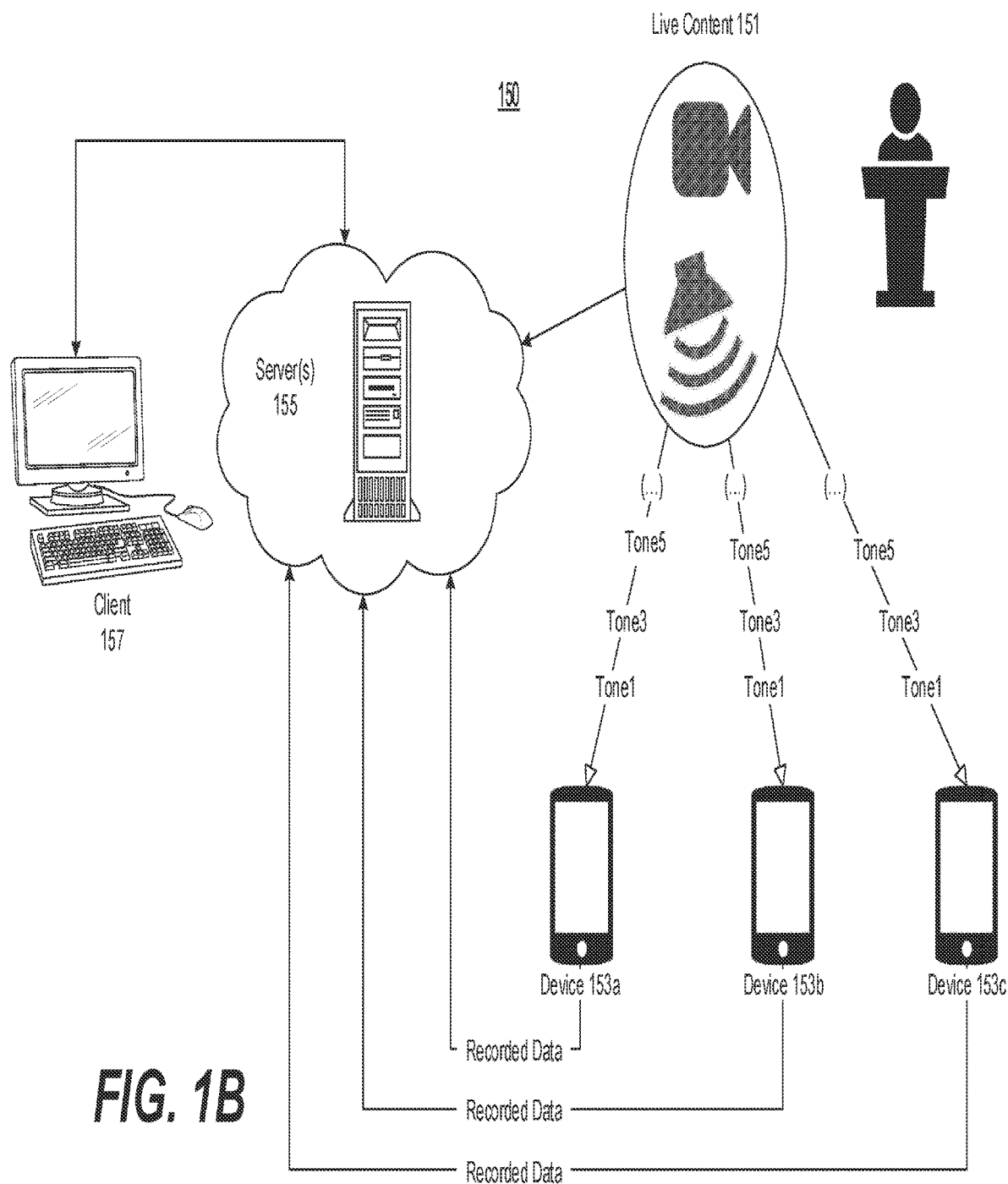
FIG. 1B is a depiction of an exemplary system for live event dial testing, according to some embodiments of the present disclosure.

FIG. 1B is a depiction of an exemplary system 150 for live event dial testing. System 150 is similar to system 100 but uses live content 151 rather than player device 107. For example, live content 151 may comprise live actions such as a speech, a theatre play, a film screening, or the like or may comprise broadcasting of live actions such as a live television broadcast of a sporting event, a live radio broadcast of a speech, or the like.

As depicted in FIG. 1B, listening devices (such as devices 153a, 153b, and 153c) may receive audio of live content 151, e.g., using microphones of the respective listening devices. The audio may include audio tones (e.g., Tone1, Tone3, and Tone5 as depicted in the example of FIG. 1B). The audio tones may be embedded into the audio of live content 151 by a broadcaster of the content. For example, a television broadcaster may insert the audio tones into a transmission of live content 151 before transmitting. Alternatively, one or more speakers associated with live content 151 may transmit the audio tones on-demand rather than embedding the audio tones within live content 151. For example, an engineer may input commands into a sound system used to transmit audio from a live speech to add audio tones on-demand to the transmitted audio.

As further depicted in FIG. 1B, devices 153*a*, 153*b*, and 153*c* may transmit information to server(s) 155. For example, server(s) 155 may comprise synchronization server 105 of FIG. 1A, and devices 153*a*, 153*b*, and 153*c* may communicate with server(s) 155 as explained above with respect to FIG. 1A. Thus, one or more software layers (not depicted) similar to software layer 103 may facilitate communication between devices 153*a*, 153*b*, and 153*c* and server(s) 155.

As further depicted in FIG. 1B, server(s) 155 may transmit information received from devices 153*a*, 153*b*, and 153*c* to client device 157 after synchronization of the received information to live content 151. For example, server(s) 155 may receive a schedule mapping the audio tones to particular timestamps. The schedule may be received from a distributor of live content 151 (such as a television or radio broadcaster) and/or from an engineer providing commands such that the audio tones are transmitted during live content 151. The schedule may comprise a relational data structure (e.g., a tabular data structure) mapping a series of audio tones to a series of timestamps.

Figure 16A:
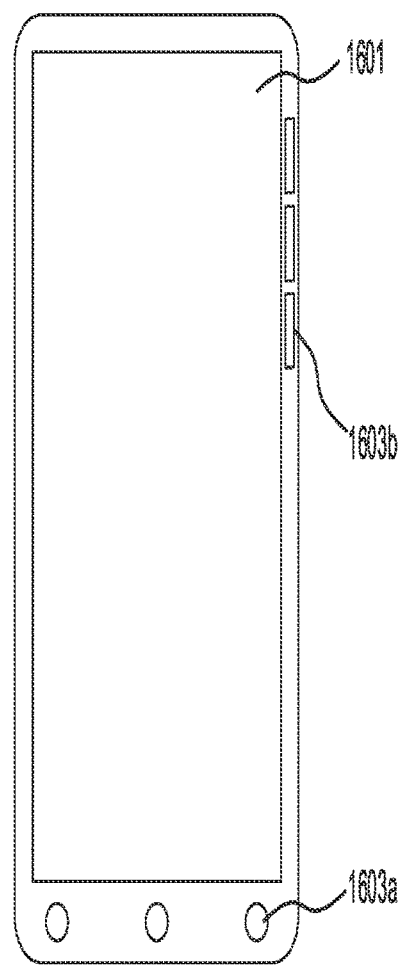
FIG. 16A is a depiction of an exemplary mobile device for use as an input device, according to some embodiments of the present disclosure.
Figure 16B:
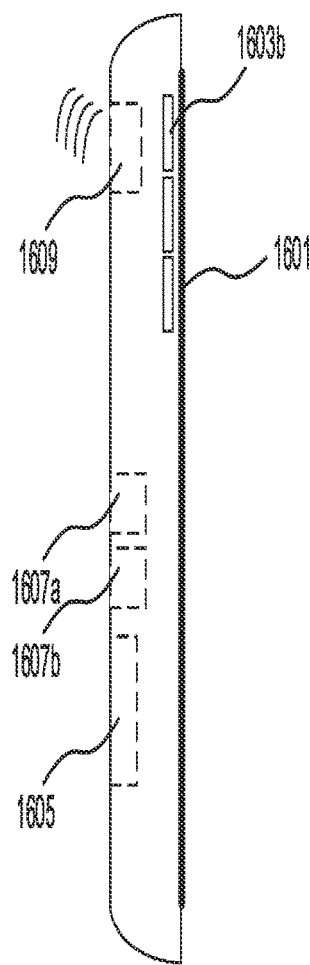
FIG. 16B is a side view of the input interaction device of FIG. 16A.

Although depicted as a desktop computer in FIG. 1B, client device 157 may comprise any computing device, such as a laptop computer, a smartphone or tablet (e.g., device 1600 of FIGS. 16A and 16B). Client device 157 may provide a display such that a user of client device 157 may view the synchronized information received from server(s) 155.

Figure 2:
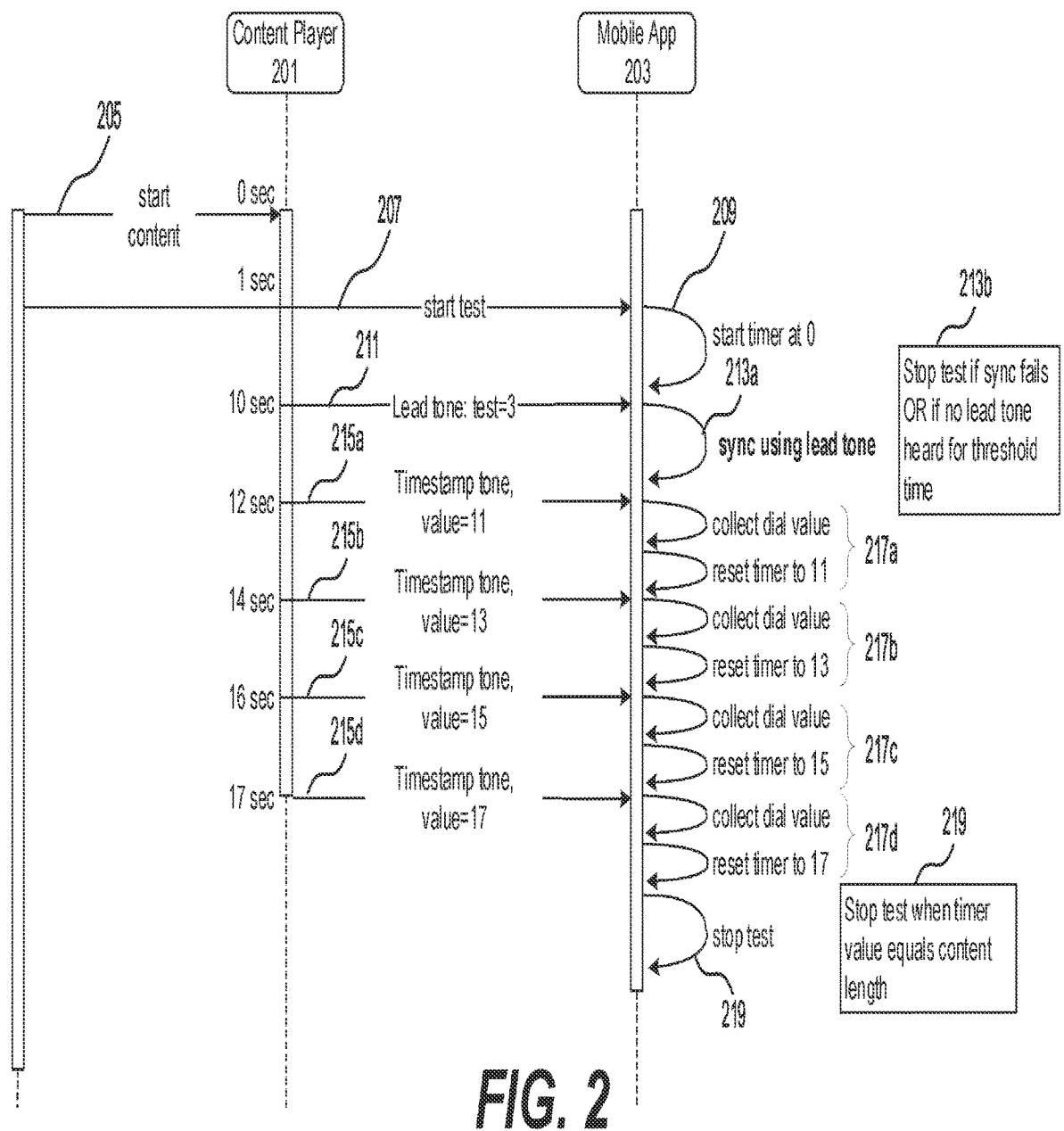
FIG. 2 is a graphical depiction of an exemplary method for synchronizing devices using audio signals, according to some embodiments of the present disclosure.

FIG. 2 is a graphical depiction of an exemplary method 200 for synchronizing devices using audio signals. Method 200 may be performed using a content player 201, which may comprise player device 107 of FIG. 1A, and a mobile application 203, which may be executed by listener device 101 of FIG. 1A.

As depicted in FIG. 2, before or during an initial portion of content started at step 205 (10 seconds in the example of FIG. 2), content player 201 may play an audio tone (one or more times) that encodes an identifier (e.g., the number "3" in the example of FIG. 3) of an expected audio stream at step 211. The audio tone may encode the identifier by comprising an audio wave whose digital representation also represents the identifier. Additionally or alternatively, the audio tone may encode the identifier by comprising an audio wave that is a representative wave that may be matched to the expected audio stream using an index of representative waves (e.g., stored in software layer 103 of FIG. 1A). Additionally or alternatively, the audio tone may encode the identifier by comprising an audio wave whose digital representation may be matched to the expected audio stream using an index of digital representations (e.g., stored in software layer 103 of FIG. 1A).

Using the audio tone encoding the identifier, mobile application 203 may verify that audio being received from content player 201 matches an expected audio stream at step 209. For example, a user and/or a remote server (not shown in FIG. 2) may initiate a test using mobile application 203 relating to the expected audio stream (and/or an identifier thereof) at step 213*a*. If the audio tone encoding the identifier does not map to the expected audio stream, mobile application 203 may, at step 213*b*, halt recording with a microphone of mobile application 203 and/or halt accepting input from a user of mobile application 203. Additionally or alternatively, mobile application 203 may a notify the user of the error. For example, the notification may include a first option to cancel recording and a second option to continue recording. The second option may result in mobile application 203 trying to verify the expected audio stream again. If the audio tone encoding the identifier maps to the expected audio stream, mobile application 203 may proceed at step 213*a*. In some embodiments, as depicted in FIG. 2, mobile application 203 may synchronize a timer at step 209 such that the timer value is set to a value corresponding to the audio tone encoding the identifier. In the example of FIG. 2, the timer is set to 10 seconds, which corresponds to the lead tone. However, other values may be associated with the lead tone, such as 5 seconds, 15 seconds, or the like.

As further depicted in FIG. 2, mobile application 203 may then receive subsequent audio tones encoding time codes, e.g., at steps 215*a*-215*d*. In the example of FIG. 2, the audio tones encode regular time codes every 2 seconds. However, other regular intervals, such as every half second, every 1 second, every 3 seconds, or the like may also be used. Additionally or alternatively, the audio tones may encode at least one irregular time code. For example, a first and second audio tone may be separated by one second while a second and third audio tone may be separated by two seconds. In such an example, other audio tones may also be separated by two seconds or may have further irregular intervals therebetween.

Mobile application 203 may decode the audio tones received (e.g., using a microphone of listener device 107) to determine time codes, e.g., at steps 217*a*-217*d*. Mobile application 203 may decode the audio tones encoding time codes similar to decoding the audio tone encoding the identifier, as described above.

Mobile application 203 may record a value input by a user in response to decoding a received audio tone. For example, the value may have been input using a graphical user interface (GUI) displaying a dial such that the user may input a value corresponding to the user's reaction to content delivered by content player 201. Additionally or alternatively, the user may use one or more input devices (such as a keyboard, a joystick, or the like) to input the value to mobile application 203. Mobile application 203 may record the value in association with the time code decoded from the received audio tone. Mobile application 203 may also reset the timer to correspond to a value associated with the decoded time code.

When the value of the timer corresponds to a length of the content, which mobile application 203 may have received from the remote server in addition to the expected audio stream (and/or an identifier thereof), mobile application 203 may halt recording of the audio and/or halt receiving input from the user at step 219. For example, mobile application 203 may display a message to the user indicating that the test is finished.

Mobile application 203 may additionally or alternatively finalize a data structure comprising the recorded values linked to corresponding values of the timer. For example, the data structure may comprise a relational data structure (e.g., a tabular data structure) mapping the recorded values to the values of the timer corresponding to the recorded values. For example, the values of the timer may be based on the resets described above. Although not depicted in FIG. 2, this finalized data structure may be transmitted to a remote server.

Figure 3:
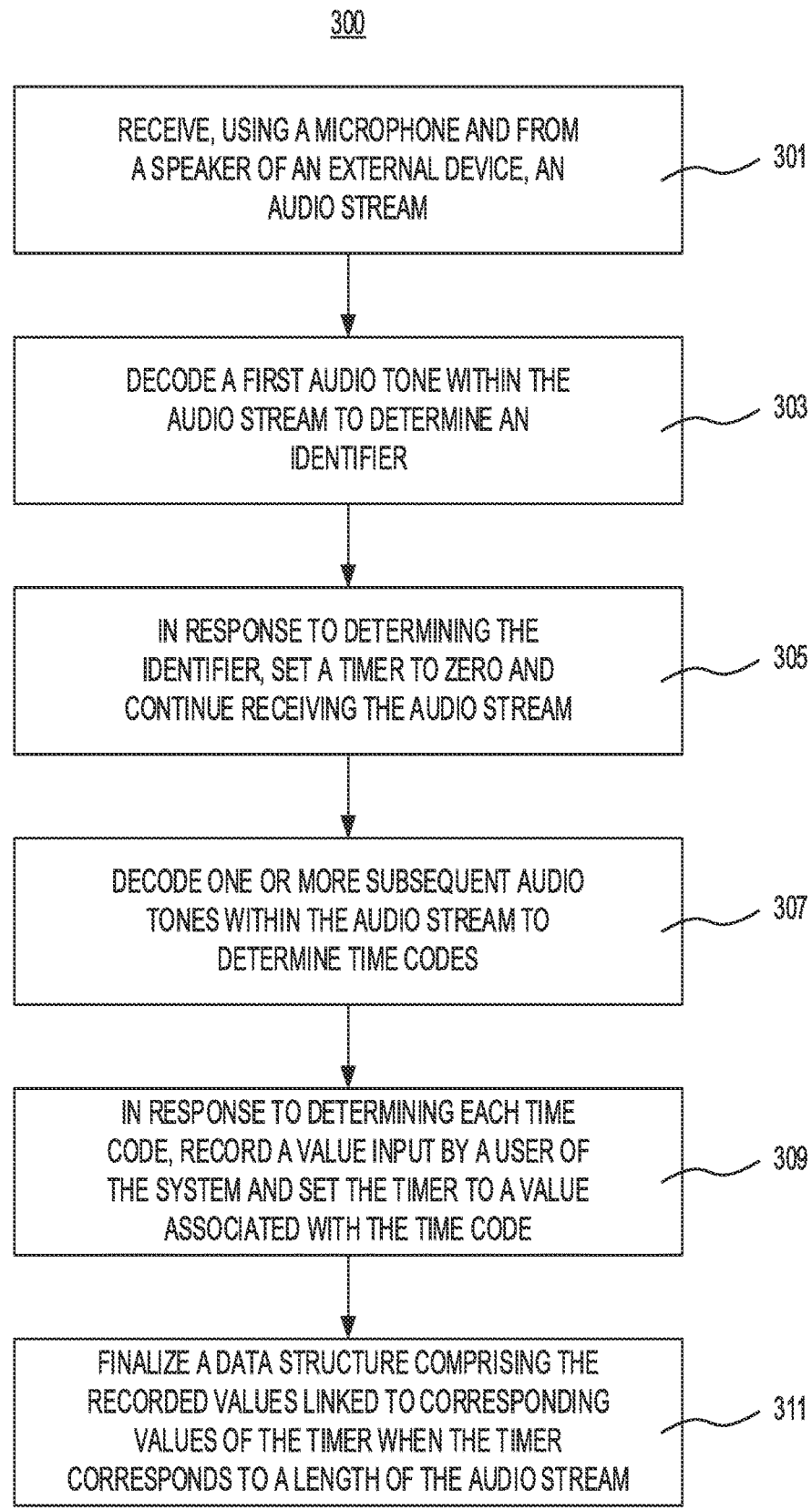
FIG. 3 is a flowchart of the exemplary method of FIG. 2, according to some embodiments of the present disclosure.

FIG. 3 is a flowchart of an exemplary method 300 for synchronizing devices using audio signals. Accordingly, method 300 may comprise an embodiment of method 200 of FIG. 2. Method 300 may be implemented using at least one processor that may form part of a user device (e.g., processor 1605 of device 1600 of FIG. 16B).

At step 301, the processor may receive, using a microphone and from a speaker of an external device, an audio stream. For example, the external device may comprise a television (such as television 1700 of FIG. 17), a radio (such as radio 1800 of FIG. 18A or radio 1850 of FIG. 18B), or any other external device having speakers to transmit audio waves to the microphone.

At step 303, the processor may decode a first audio tone within the audio stream to determine an identifier. For example, as explained above, the audio tone may encode the identifier by comprising an audio wave whose digital representation also represents the identifier. Additionally or alternatively, the audio tone may encode the identifier by comprising an audio wave that is a representative wave that may be matched to the expected audio stream using an index of representative waves (e.g., stored in software layer 103 of FIG. 1A and/or in server 105 of FIG. 1A). Additionally or alternatively, the audio tone may encode the identifier by comprising an audio wave whose digital representation may be matched to the expected audio stream using an index of digital representations (e.g., stored in software layer 103 of FIG. 1A and/or in server 105 of FIG. 1A). In some embodiments, the processor may communicate with a remote server (e.g., server 105 of FIG. 1A) to assist with the decoding.

At step 305, the processor may, in response to determining the identifier, set a timer to zero and continue receiving the audio steam. For example, the as explained above, the processor may set a timer than increments at regular time intervals, such as every half second, every one second, every two seconds, or the like, after determination of the identifier.

In some embodiments, determining the identifier may include verifying that the audio being received by the processor matches an expected audio stream. For example, a user of the processor and/or a remote server (e.g., server 105 of FIG. 1A) may initiate a test using the processor relating to the expected audio stream (and/or the identifier thereof). If the audio tone encoding the identifier does not map to the expected audio stream, the processor may halt recording with the microphone and/or halt accepting input from the user. Additionally or alternatively, the processor may a notify the user of the error. For example, the notification may include a first option to cancel recording and a second option to continue recording. The second option may result in the processor trying to verify the expected audio stream again. If the audio tone encoding the identifier maps to the expected audio stream, the processor may proceed with method 200.

In some embodiments, the processor may further synchronize a timer such that the timer value is set to a value corresponding to the audio tone encoding the identifier. In other embodiments, the processor may only synchronize using audio tones encoding time codes, as explained below in step 307.

At step 307, the processor may decode one or more subsequent audio tones within the audio stream to determine time codes. For example, the audio tones may encode time codes similar to how the audio tone encodes the identifier, as described above in step 303.

At step 309, the processor may, in response to determining each time code, record a value input by a user of the system and set the timer to a value associated with the time code. For example, the value may have been input using a graphical user interface (GUI) displaying a dial such that the user may input a value corresponding to the user's reaction to content including the received audio. Additionally or alternatively, the user may use one or more input devices (such as a keyboard, a joystick, or the like) to input the value to the processor. Moreover, the processor may record the value in association with the determined time code.

At step 311, the processor may finalize a data structure comprising the recorded values linked to corresponding values of the timer when the timer corresponds to a length of the audio stream. For example, as explained above, the data structure may comprise a relational data structure (e.g., a tabular data structure) mapping the recorded values to the values of the timer corresponding to the recorded values. The values of the timer may be based on the resets of the timer described above in step 309.

Method 300 may include further steps. For example, the processor may transmit the finalized data structure to a remote server (e.g., server 150 of FIG. 1A). Additionally or alternatively, when the value of the timer corresponds to a length of the content, which the processor may have received from the remote server in addition to the expected audio stream (and/or the identifier thereof), the processor may halt recording of the audio and/or halt receiving input from the user. For example, the processor may display a message to the user indicating that the test is finished.

Figure 4:
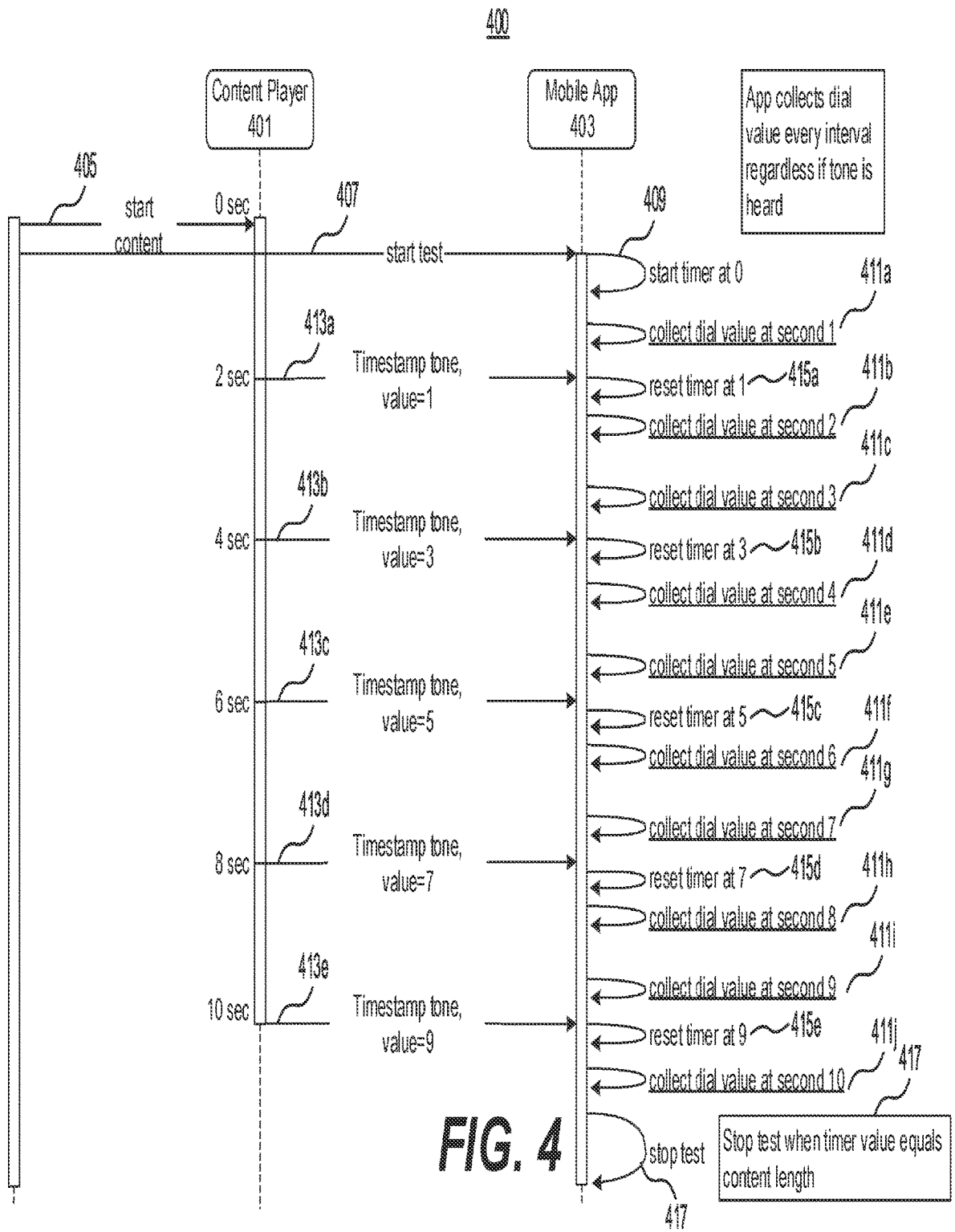
FIG. 4 is a graphical depiction of another exemplary method for synchronizing devices using audio signals, according to some embodiments of the present disclosure.

FIG. 4 is a graphical depiction of an exemplary method 400 for synchronizing devices using audio signals. Method 400 may be performed using a content player 401, which may comprise player device 107 of FIG. 1A, and a mobile application 403, which may be executed by listener device 101 of FIG. 1A.

As depicted in FIG. 4, content player 401 may start content at step 405 (10 seconds in the example of FIG. 4). Moreover, a user and/or a remote server (not shown in FIG. 4) may initiate a test using mobile application 403 relating to the expected audio stream (and/or an identifier thereof) at step 407. In some embodiments, as depicted in FIG. 4, mobile application 403 may synchronize a timer at step 409 such that the timer value is set to a value corresponding to a length of expected content. In the example of FIG. 4, the timer is set to 10 seconds; however, other values may be used, such as 5 seconds, 15 seconds, or the like.

As further depicted in FIG. 4, mobile application 403 may receive (e.g., using a microphone of listener device 107) audio tones encoding time codes, e.g., at steps 413a-413e. In the example of FIG. 4, the audio tones encode regular time codes every 2 seconds. However, other regular intervals, such as every half second, every 1 second, every 3 seconds, or the like may also be used. Additionally or alternatively, the audio tones may encode at least one irregular time code. For example, a first and second audio tone may be separated by one second while a second and third audio tone may be separated by two seconds. In such an example, other audio tones may also be separated by two seconds or may have further irregular intervals therebetween. As explained above, the audio tones may encode the time codes by comprising audio waves whose digital representations also represent the time codes. Additionally or alternatively, the audio tones may encode the time codes by comprising audio waves that are representative waves that may be matched to the predetermined time codes using an index of representative waves (e.g., stored in software layer 103 of FIG. 1A). Additionally or alternatively, the audio tones may encode the time codes by comprising audio waves whose digital representations may be matched to the predetermined time codes using an index of digital representations (e.g., stored in software layer 103 of FIG. 1A).

Mobile application 403 may record values input by a user at intervals, e.g., at steps 411*a*-411*j*. For example, the value may have been input using a graphical user interface (GUI) displaying a dial such that the user may input a value corresponding to the user's reaction to content delivered by content player 401. Additionally or alternatively, the user may use one or more input devices (such as a keyboard, a joystick, or the like) to input the value to mobile application 403. In the example of FIG. 4, mobile application 403 captures an input value every 1 second. However, other regular intervals, such as every half second, every 2 seconds, every 3 seconds, or the like may also be used. Additionally or alternatively, mobile application 403 may capture an input value during at least one irregular interval. For example, a first input value and second input value may be captured at times differing by one second while a second input value and third input value may be captured at times differing by two seconds. In such an example, other input values may also be captured within intervals of two seconds or may have further irregular intervals therebetween.

In response to each time code, mobile application 403 may reset a timer to correspond to a value associated with each decoded time code, e.g., at steps 415*a*-415*e*. Moreover, mobile application 403 may record the decoded time codes in associated with the captured input values.

When the value of the timer corresponds to a length of the content, which mobile application 403 may have received from the remote server in addition to the expected audio stream (and/or an identifier thereof), mobile application 403 may halt recording of the audio and/or halt receiving input from the user at step 417. For example, mobile application 403 may display a message to the user indicating that the test is finished.

Mobile application 403 may additionally or alternatively finalize a data structure comprising the recorded values linked to corresponding values of the timer. For example, the data structure may comprise a relational data structure (e.g., a tabular data structure) mapping the recorded values to the values of the timer corresponding to the recorded values. For example, the values of the timer may be based on the resets described above. In some embodiments, mobile application 403 may correlate timestamps associated with the captured values to the corresponding values of the timer. In other embodiments, mobile application 403 may send the data structure with unaltered timestamps and corresponding timer values. Accordingly, although not depicted in FIG. 4, the finalized data structure may be transmitted to a remote server. Thus, in some embodiments, the remote server may perform the correlation.

Figure 5:
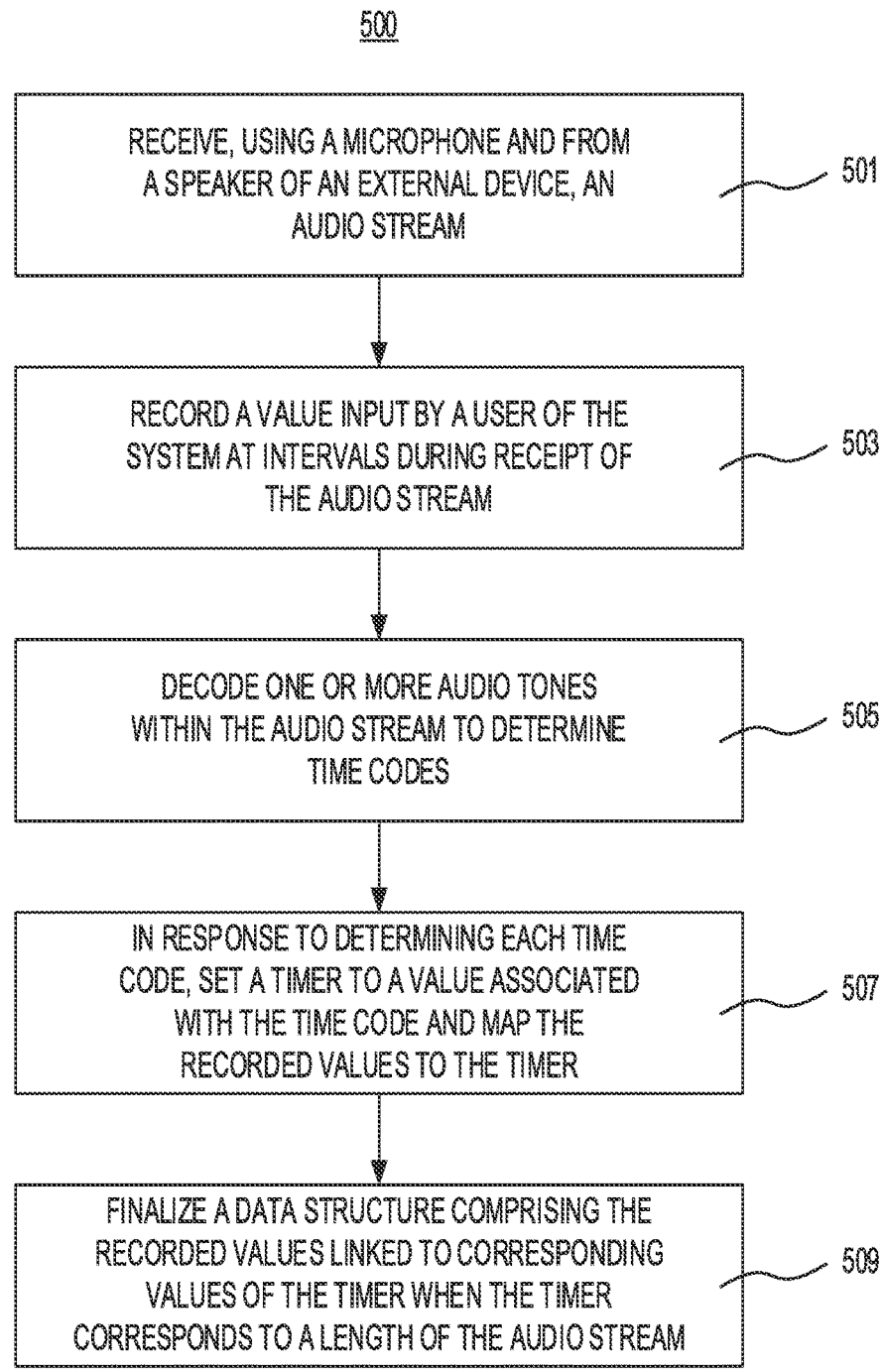
FIG. 5 is a flowchart of the exemplary method of FIG. 4, according to some embodiments of the present disclosure.

FIG. 5 is a flowchart of an exemplary method 500 for synchronizing devices using audio signals. Accordingly, method 500 may comprise an embodiment of method 400 of FIG. 4. Method 500 may be implemented using at least one processor that may form part of a user device (e.g., processor 1605 of device 1600 of FIG. 16B).

At step 501, the processor may receive, using a microphone and from a speaker of an external device, an audio stream. For example, the external device may comprise a television (such as television 1700 of FIG. 17), a radio (such as radio 1800 of FIG. 18A or radio 1850 of FIG. 18B), or any other external device having speakers to transmit audio waves to the microphone.

At step 503, the processor may record, at intervals, values input by a user of the system during receipt of the audio stream. For example, the value may have been input using a graphical user interface (GUI) displaying a dial such that the user may input a value corresponding to the user's reaction to content including the received audio. Additionally or alternatively, the user may use one or more input devices (such as a keyboard, a joystick, or the like) to input the value to the processor. The processor may record values at regular intervals, such as every half second, every second, every 2 seconds, every 3 seconds, or the like. Additionally or alternatively, the processor may capture an input value during at least one irregular interval. For example, the processor may capture a first input value and second input value at times differing by one second while a second input value and third input value may be captured at times differing by two seconds. In such an example, the processor may also capture other input values within intervals of two seconds or may have further irregular intervals therebetween.

At step 505, the processor may decode one or more audio tones within the audio stream to determine time codes. For example, the audio tones may encode regular time codes, such as every half second, every second, every 2 seconds, every 3 seconds, or the like. Additionally or alternatively, the audio tones may encode at least one irregular time code. For example, a first and second audio tone may be separated by one second while a second and third audio tone may be separated by two seconds. In such an example, other audio tones may also be separated by two seconds or may have further irregular intervals therebetween. As explained above, the audio tones may encode the time codes by comprising audio waves whose digital representations also represent the time codes. Additionally or alternatively, the audio tones may encode the time codes by comprising audio waves that are representative waves that may be matched to the predetermined time codes using an index of representative waves (e.g., stored in software layer 103 of FIG. 1A and/or in server 105 of FIG. 1A). Additionally or alternatively, the audio tones may encode the time codes by comprising audio waves whose digital representations may be matched to the predetermined time codes using an index of digital representations (e.g., stored in software layer 103 of FIG. 1A and/or in server 105 of FIG. 1A).

At step 507, the processor may, in response to determining each time code, set a timer to a value associated with the time code and map the recorded values to the timer. At step 509, the processor may finalize a data structure comprising the recorded values linked to corresponding values of the timer when the timer corresponds to a length of the audio stream. For example, the data structure may comprise a relational data structure (e.g., a tabular data structure) mapping the recorded values to the values of the timer corresponding to the recorded values. For example, the values of the timer may be based on the resets described above in step 507. In some embodiments, the processor may send the data structure with unaltered timestamps and corresponding timer values, e.g., with a raw mapping rather than a correlated mapping.

Method 500 may include further steps. For example, the processor may transmit the finalized data structure to a remote server (e.g., server 150 of FIG. 1A). Additionally or alternatively, when the value of the timer corresponds to a length of the content, which the processor may have received from the remote server in addition to the expected audio stream (and/or an identifier thereof), the processor may halt recording of the audio and/or halt receiving input from the user. For example, the processor may display a message to the user indicating that the test is finished.

Figure 6:
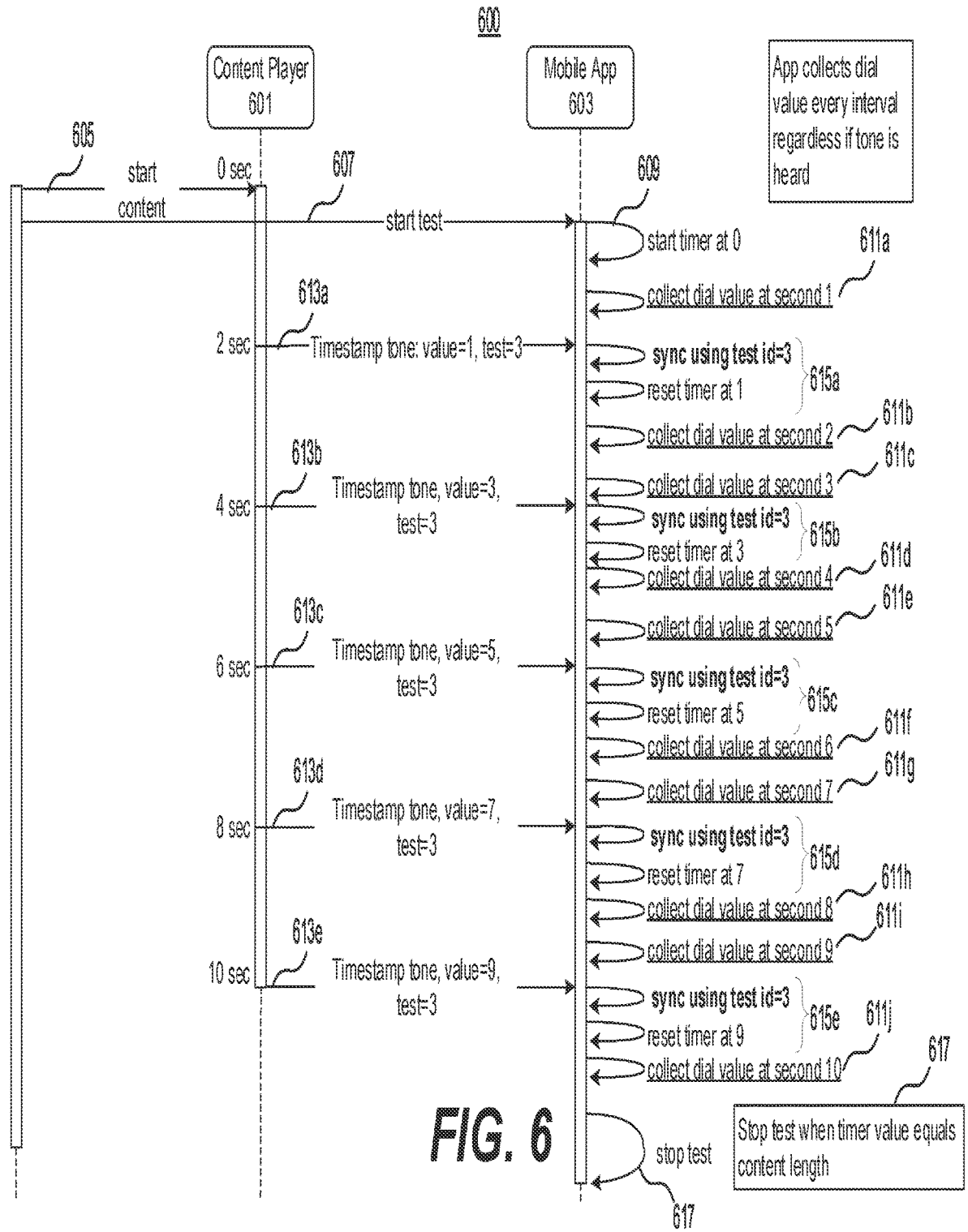
FIG. 6 is a graphical depiction of a third exemplary method for synchronizing devices using audio signals, according to some embodiments of the present disclosure.

FIG. 6 is a graphical depiction of an exemplary method 600 for synchronizing devices using audio signals. Method 600 may be performed using a content player 601, which may comprise player device 107 of FIG. 1A, and a mobile application 603, which may be executed by listener device 101 of FIG. 1A.

As depicted in FIG. 6, content player 601 may start content at step 605 (10 seconds in the example of FIG. 6). Moreover, a user and/or a remote server (not shown in FIG. 6) may initiate a test using mobile application 603 relating to the expected audio stream (and/or an identifier thereof) at step 607. In some embodiments, as depicted in FIG. 6, mobile application 603 may synchronize a timer at step 609 such that the timer value is set to a value corresponding to a length of expected content. In the example of FIG. 6, the timer is set to 10 seconds; however, other values may be used, such as 5 seconds, 15 seconds, or the like.

As depicted in FIG. 6, mobile application 603 may receive (e.g., using a microphone of listener device 107) audio tones encoding time codes, e.g., at steps 613a-613e. In the example of FIG. 6, the audio tones encode regular time codes every 2 seconds. However, other regular intervals, such as every half second, every 1 second, every 3 seconds, or the like may also be used. Additionally or alternatively, the audio tones may encode at least one irregular time code. For example, a first and second audio tone may be separated by one second while a second and third audio tone may be separated by two seconds. In such an example, other audio tones may also be separated by two seconds or may have further irregular intervals therebetween. As explained above, the audio tones may encode the time codes by comprising audio waves whose digital representations also represent the time codes. Additionally or alternatively, the audio tones may encode the time codes by comprising audio waves that are representative waves that may be matched to the predetermined time codes using an index of representative waves (e.g., stored in software layer 103 of FIG. 1A). Additionally or alternatively, the audio tones may encode the time codes by comprising audio waves whose digital representations may be matched to the predetermined time codes using an index of digital representations (e.g., stored in software layer 103 of FIG. 1A).

In addition to audio tones encoding time codes, the audio tones may encode an identifier (e.g., the number "3" in the example of FIG. 6) of an expected audio stream. The audio tone may encode the identifier similar to encoding the time code as explained above. In some embodiments, a single, longer audio tone may encode both the time code and the identifier (e.g., using a temporal order to differentiate). In other embodiments, the audio tones depicted in FIG. 6 may comprise two separate tones that are separated by a short amount of time (e.g., 100 milliseconds, 200 milliseconds, 500 milliseconds, or the like).

Using the decoded identifiers, mobile application 603 may verify that audio being received from content player 601 matches an expected audio stream, e.g., at steps 615a-615e. For example, a user and/or a remote server (not shown in FIG. 6) may have initiated a test using mobile application 603 relating to the expected audio stream (and/or an identifier thereof). If the audio tone encoding the identifier does not map to the expected audio stream, mobile application 603 may pause recording with a microphone of mobile application 603 and/or pause accepting input from a user of mobile application 603. Additionally or alternatively, mobile application 603 may a notify the user of the error. For example, the notification may include a first option to cancel recording and a second option to continue recording. The second option may result in mobile application 603 trying to resume recording and/or accepting input such that mobile application 603 will again attempt to verify against the expected audio stream when the next audio tone is received. If the next audio tone encoding the identifier maps to the expected audio stream, mobile application 603 may continue. If any gaps in recorded values (as explained below) are present on account of the pause, mobile application 603 may null out such gaps (e.g., with gap-filling zeros or with linear, quadratic, logistic, or other extrapolation from one or more values immediately preceding the gap and/or one or more values immediately after the gap).

Mobile application 603 may record values input by a user at intervals, e.g., at steps 611a-611j. For example, the value may have been input using a graphical user interface (GUI) displaying a dial such that the user may input a value corresponding to the user's reaction to content delivered by content player 601. Additionally or alternatively, the user may use one or more input devices (such as a keyboard, a joystick, or the like) to input the value to mobile application 603. In the example of FIG. 6, mobile application 603 captures an input value every 1 second. However, other regular intervals, such as every half second, every 2 seconds, every 3 seconds, or the like may also be used. Additionally or alternatively, mobile application 603 may capture an input value during at least one irregular interval. For example, a first input value and second input value may be captured at times differing by one second while a second input value and third input value may be captured at times differing by two seconds. In such an example, other input values may also be captured within intervals of two seconds or may have further irregular intervals therebetween.

In response to each time code, mobile application 603 may reset a timer to correspond to a value associated with each decoded time code, e.g., at steps 615a-615e. Moreover, mobile application 603 may record the decoded time codes in associated with the captured input values.

When the value of the timer corresponds to a length of the content, which mobile application 603 may have received from the remote server in addition to the expected audio stream (and/or an identifier thereof), mobile application 603 may halt recording of the audio and/or halt receiving input from the user at step 617. For example, mobile application 603 may display a message to the user indicating that the test is finished.

Mobile application 603 may additionally or alternatively finalize a data structure comprising the recorded values linked to corresponding values of the timer. For example, the data structure may comprise a relational data structure (e.g., a tabular data structure) mapping the recorded values to the values of the timer corresponding to the recorded values. For example, the values of the timer may be based on the resets described above. In some embodiments, mobile application 603 may correlate timestamps associated with the captured values to the corresponding values of the timer. In other embodiments, mobile application 603 may send the data structure with unaltered timestamps and corresponding timer values. Accordingly, although not depicted in FIG. 6, the finalized data structure may be transmitted to a remote server. Thus, in some embodiments, the remote server may perform the correlation.

Figure 7:
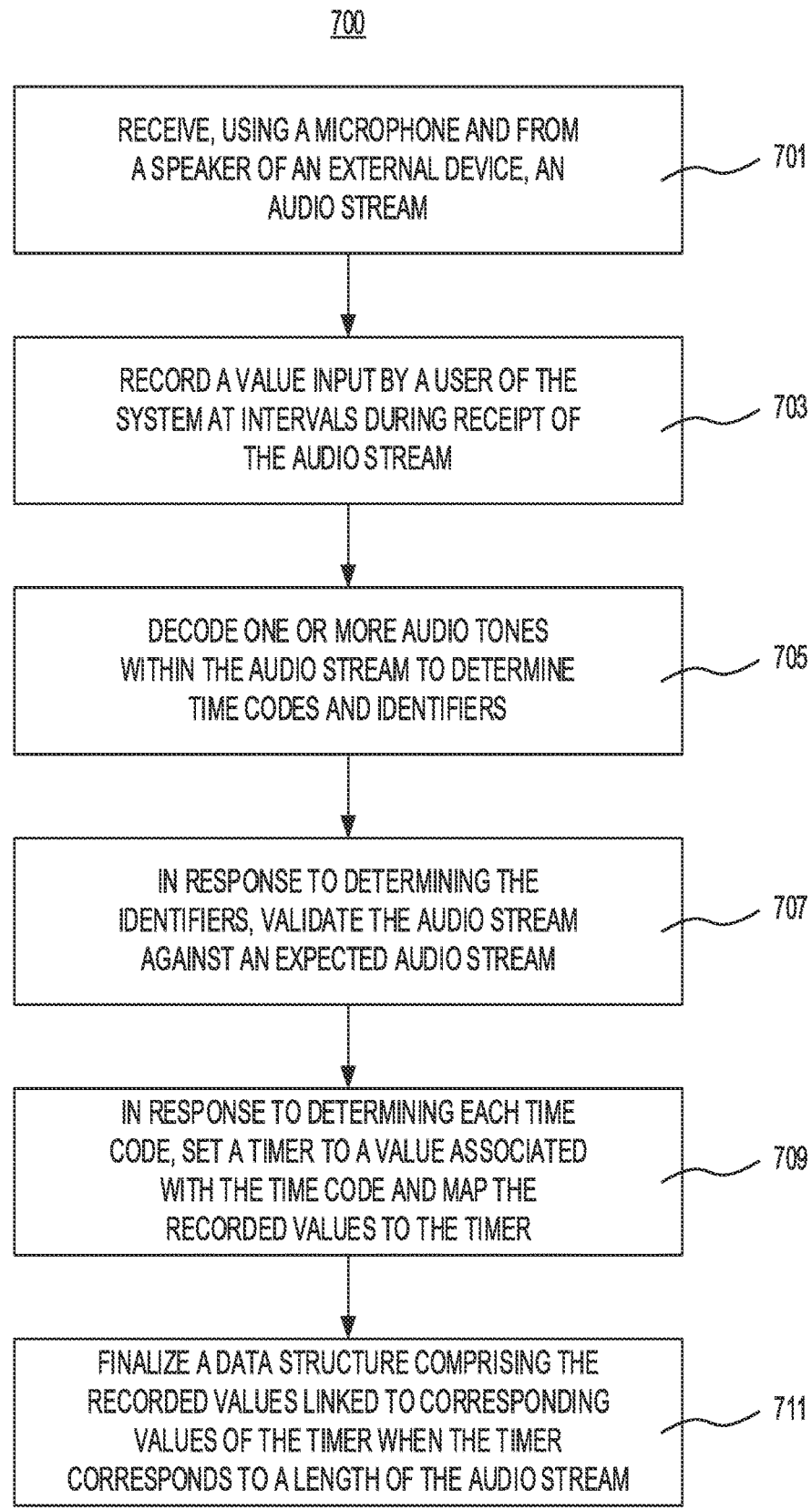
FIG. 7 is a flowchart of the exemplary method of FIG. 6, according to some embodiments of the present disclosure.

FIG. 7 is a flowchart of an exemplary method 700 for synchronizing devices using audio signals. Accordingly, method 700 may comprise an embodiment of method 600 of FIG. 6. Method 700 may be implemented using at least one processor that may form part of a user device (e.g., processor 1605 of device 1600 of FIG. 16B).

At step 701, the processor may receive using a microphone and from a speaker of an external device, an audio stream. For example, the external device may comprise a television (such as television 1700 of FIG. 17), a radio (such as radio 1800 of FIG. 18A or radio 1850 of FIG. 18B), or any other external device having speakers to transmit audio waves to the microphone.

At step 703, the processor may record, at intervals, values input by a user of the system during receipt of the audio stream. For example, the value may have been input using a graphical user interface (GUI) displaying a dial such that the user may input a value corresponding to the user's reaction to content including the received audio. Additionally or alternatively, the user may use one or more input devices (such as a keyboard, a joystick, or the like) to input the value to the processor. The processor may record values at regular intervals, such as every half second, every second, every 2 seconds, every 3 seconds, or the like. Additionally or alternatively, the processor may capture an input value during at least one irregular interval. For example, the processor may capture a first input value and second input value at times differing by one second while a second input value and third input value may be captured at times differing by two seconds. In such an example, the processor may also capture other input values within intervals of two seconds or may have further irregular intervals therebetween.

At step 705, the processor may decode one or more audio tones within the audio stream to determine time codes and identifiers. For example, the audio tones may encode regular time codes, such as every half second, every second, every 2 seconds, every 3 seconds, or the like. Additionally or alternatively, the audio tones may encode at least one irregular time code. For example, a first and second audio tone may be separated by one second while a second and third audio tone may be separated by two seconds. In such an example, other audio tones may also be separated by two seconds or may have further irregular intervals therebetween. As explained above, the audio tones may encode the time codes by comprising audio waves whose digital representations also represent the time codes. Additionally or alternatively, the audio tones may encode the time codes by comprising audio waves that are representative waves that may be matched to the predetermined time codes using an index of representative waves (e.g., stored in software layer 103 of FIG. 1A and/or in server 105 of FIG. 1A). Additionally or alternatively, the audio tones may encode the time codes by comprising audio waves whose digital representations may be matched to the predetermined time codes using an index of digital representations (e.g., stored in software layer 103 of FIG. 1A and/or in server 105 of FIG. 1A).

The audio tones may also encode the identifiers similar to encoding the time codes, as explained above. In some embodiments, a single, longer audio tone may encode both the time code and the identifier (e.g., using a temporal order to differentiate). In other embodiments, the audio tones may comprise two separate tones that are separated by a short amount of time (e.g., 100 milliseconds, 200 milliseconds, 500 milliseconds, or the like).

At step 707, the processor may, using the identifiers, validate the audio stream against an expected audio stream. For example, a user of the processor and/or a remote server (e.g., server 105 of FIG. 1A) may initiate a test using the processor relating to the expected audio stream (and/or the identifier thereof). If the audio tone encoding the identifier does not map to the expected audio stream, the processor may pause recording with the microphone and/or pause accepting input from the user. Additionally or alternatively, the processor may a notify the user of the error. For example, the notification may include a first option to cancel recording and a second option to continue recording. The second option may result in the processor trying to resume recording and/or accepting input such that the processor will again attempt to verify against the expected audio stream when the next audio tone is received. If the next audio tone encoding the identifier maps to the expected audio stream, the processor may continue executing method 700. If any gaps in recorded values are present on account of the pause in step 707, the processor may null out such gaps (e.g., with gap-filling zeros) or may fill such gaps using linear, quadratic, logistic, or other extrapolation from one or more values immediately preceding the gap and/or one or more values immediately after the gap.

At step 709, the processor may, in response to determining each time code, set a timer to a value associated with the time code and map the recorded values to the timer. At step 711, the processor may finalize a data structure comprising the recorded values linked to corresponding values of the timer when the timer corresponds to a length of the audio stream. For example, the data structure may comprise a relational data structure (e.g., a tabular data structure) mapping the recorded values to the values of the timer corresponding to the recorded values. For example, the values of the timer may be based on the resets described above in step 709. In some embodiments, the processor may send the data structure with unaltered timestamps and corresponding timer values, e.g., with a raw mapping rather than a correlated mapping.

Method 700 may include further steps. For example, the processor may transmit the finalized data structure to a remote server (e.g., server 150 of FIG. 1A). Additionally or alternatively, when the value of the timer corresponds to a length of the content, which the processor may have received from the remote server in addition to the expected audio stream (and/or an identifier thereof), the processor may halt recording of the audio and/or halt receiving input from the user. For example, the processor may display a message to the user indicating that the test is finished.

Figure 8:
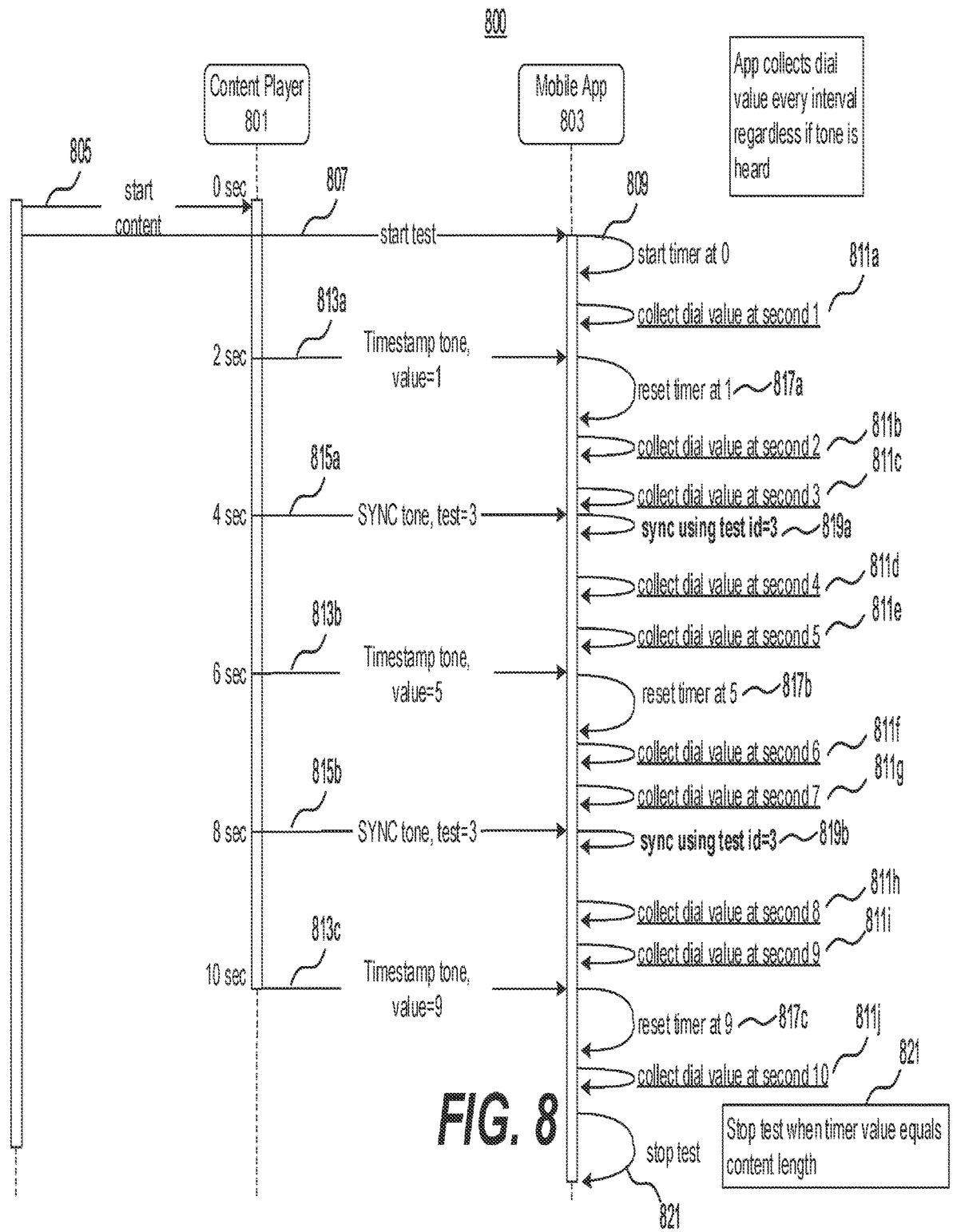
FIG. 8 is a graphical depiction of a fourth exemplary method for synchronizing devices using audio signals, according to some embodiments of the present disclosure.

FIG. 8 is a graphical depiction of an exemplary method 800 for synchronizing devices using audio signals. Method 800 may be performed using a content player 801, which may comprise player device 107 of FIG. 1A, and a mobile application 803, which may be executed by listener device 101 of FIG. 1A.

As depicted in FIG. 8, content player 801 may start content at step 805 (10 seconds in the example of FIG. 8). Moreover, a user and/or a remote server (not shown in FIG. 8) may initiate a test using mobile application 803 relating to the expected audio stream (and/or an identifier thereof) at step 807. In some embodiments, as depicted in FIG. 8, mobile application 803 may synchronize a timer at step 809 such that the timer value is set to a value corresponding to a length of expected content. In the example of FIG. 8, the timer is set to 10 seconds; however, other values may be used, such as 5 seconds, 15 seconds, or the like.

As depicted in FIG. 8, mobile application 803 may receive (e.g., using a microphone of listener device 107) first audio tones encoding time codes, e.g., at steps 813a-813c. In the example of FIG. 8, the first audio tones encode regular time codes every 4 seconds. However, other regular intervals, such as every half second, every 1 second, every 2 seconds, every 3 seconds, every 5 seconds, or the like may also be used. Additionally or alternatively, the first audio tones may encode at least one irregular time code. For example, a first tone and second tone of the first audio tones may be separated by one second while a second tone and a third tone of the first audio tones may be separated by two seconds. In such an example, other first audio tones may also be separated by two seconds or may have further irregular intervals therebetween. As explained above, the first audio tones may encode the time codes by comprising audio waves whose digital representations also represent the time codes. Additionally or alternatively, the first audio tones may encode the time codes by comprising audio waves that are representative waves that may be matched to the predetermined time codes using an index of representative waves (e.g., stored in software layer 103 of FIG. 1A). Additionally or alternatively, the first audio tones may encode the time codes by comprising audio waves whose digital representations may be matched to the predetermined time codes using an index of digital representations (e.g., stored in software layer 103 of FIG. 1A).

In addition to receiving first audio tones encoding time codes, mobile application 803 may receive (e.g., using a microphone of listener device 107) second audio tones encoding an identifier (e.g., the number "3" in the example of FIG. 6) of an expected audio stream, e.g., at steps 815*a* and 815*b*. The second audio tones may encode the identifier similar to how the first audio tones encode the time codes, as explained above. In the example of FIG. 8, the second audio tones are transmitted at regular intervals of 4 seconds. However, other regular intervals, such as every half second, every 1 second, every 2 seconds, every 3 seconds, every five seconds, or the like may also be used. Additionally or alternatively, the second audio tones may be transmitted across at least one irregular interval. For example, a first tone and second tone of the second audio tones may be separated by one second while a second tone and a third tone of the second audio tones may be separated by two seconds. In such an example, other second audio tones may also be separated by two seconds or may have further irregular intervals therebetween. Moreover, although depicted as evenly spaced between first audio tones, one or more of the second audio tones may be offset from the first audio tones (e.g., being transmitted one second after a first audio tone such that the next first audio tone is more than one second after the second audio tone, being transmitted two seconds after a first audio tone such that the next first audio tone is less than two seconds after the second audio tone, or the like). Additionally or alternatively, the spacing between first and second audio tones may vary. Additionally or alternatively, content player 801 may use other regular patterns of first and second audio tones (such as two first audio tones followed by a single second audio tone, one first audio tone followed by two second audio tones, or the like) and/or irregular sequences (such as two first audio tones followed by one single second audio tone followed by one single first audio tone, or other irregular sequences).

Using the decoded identifiers, mobile application 803 may verify that audio being received from content player 801 matches an expected audio stream, e.g., at steps 819*a* and 819*b*. For example, a user and/or a remote server (not shown in FIG. 8) may have initiated a test using mobile application 803 relating to the expected audio stream (and/or an identifier thereof). If a second audio tone encoding the identifier does not map to the expected audio stream, mobile application 803 may pause recording with a microphone of mobile application 803 and/or pause accepting input from a user of mobile application 803. Additionally or alternatively, mobile application 803 may a notify the user of the error. For example, the notification may include a first option to cancel recording and a second option to continue recording. The second option may result in mobile application 803 trying to resume recording and/or accepting input such that mobile application 803 will again attempt to verify against the expected audio stream when the next second audio tone is received. If the next second audio tone encoding the identifier maps to the expected audio stream, mobile application 803 may continue. If any gaps in recorded values (as explained below) are present on account of the pause, mobile application 803 may null out such gaps (e.g., with gap-filling zeros or with linear, quadratic, logistic, or other extrapolation from one or more values immediately preceding the gap and/or one or more values immediately after the gap).

Mobile application 803 may record values input by a user at intervals, e.g., at steps 811*a*-811*j*. For example, the value may have been input using a graphical user interface (GUI) displaying a dial such that the user may input a value corresponding to the user's reaction to content delivered by content player 801. Additionally or alternatively, the user may use one or more input devices (such as a keyboard, a joystick, or the like) to input the value to mobile application 803. In the example of FIG. 8, mobile application 803 captures an input value every 1 second. However, other regular intervals, such as every halt second, every 2 seconds, every 3 seconds, or the like may also be used. Additionally or alternatively, mobile application 803 may capture an input value during at least one irregular interval. For example, a first input value and second input value may be captured at times differing by one second while a second input value and third input value may be captured at times differing by two seconds. In such an example, other input values may also be captured within intervals of two seconds or may have further irregular intervals therebetween.

In response to each time code, mobile application 803 may reset a timer to correspond to a value associated with each decoded time code, e.g., at steps 817*a*-817*c*. Moreover, mobile application 803 may record the decoded time codes in associated with the captured input values.

When the value of the timer corresponds to a length of the content, which mobile application 803 may have received from the remote server in addition to the expected audio stream (and/or an identifier thereof), mobile application 803 may halt recording of the audio and/or halt receiving input from the user at step 821. For example, mobile application 803 may display a message to the user indicating that the test is finished.

Mobile application 803 may additionally or alternatively finalize a data structure comprising the recorded values linked to corresponding values of the timer. For example, the data structure may comprise a relational data structure (e.g., a tabular data structure) mapping the recorded values to the values of the timer corresponding to the recorded values. For example, the values of the timer may be based on the resets described above. In some embodiments, mobile application 803 may correlate timestamps associated with the captured values to the corresponding values of the timer. In other embodiments, mobile application 803 may send the data structure with unaltered timestamps and corresponding timer values. Accordingly, although not depicted in FIG. 8, the finalized data structure may be transmitted to a remote server. Thus, in some embodiments, the remote server may perform the correlation.

Figure 9:
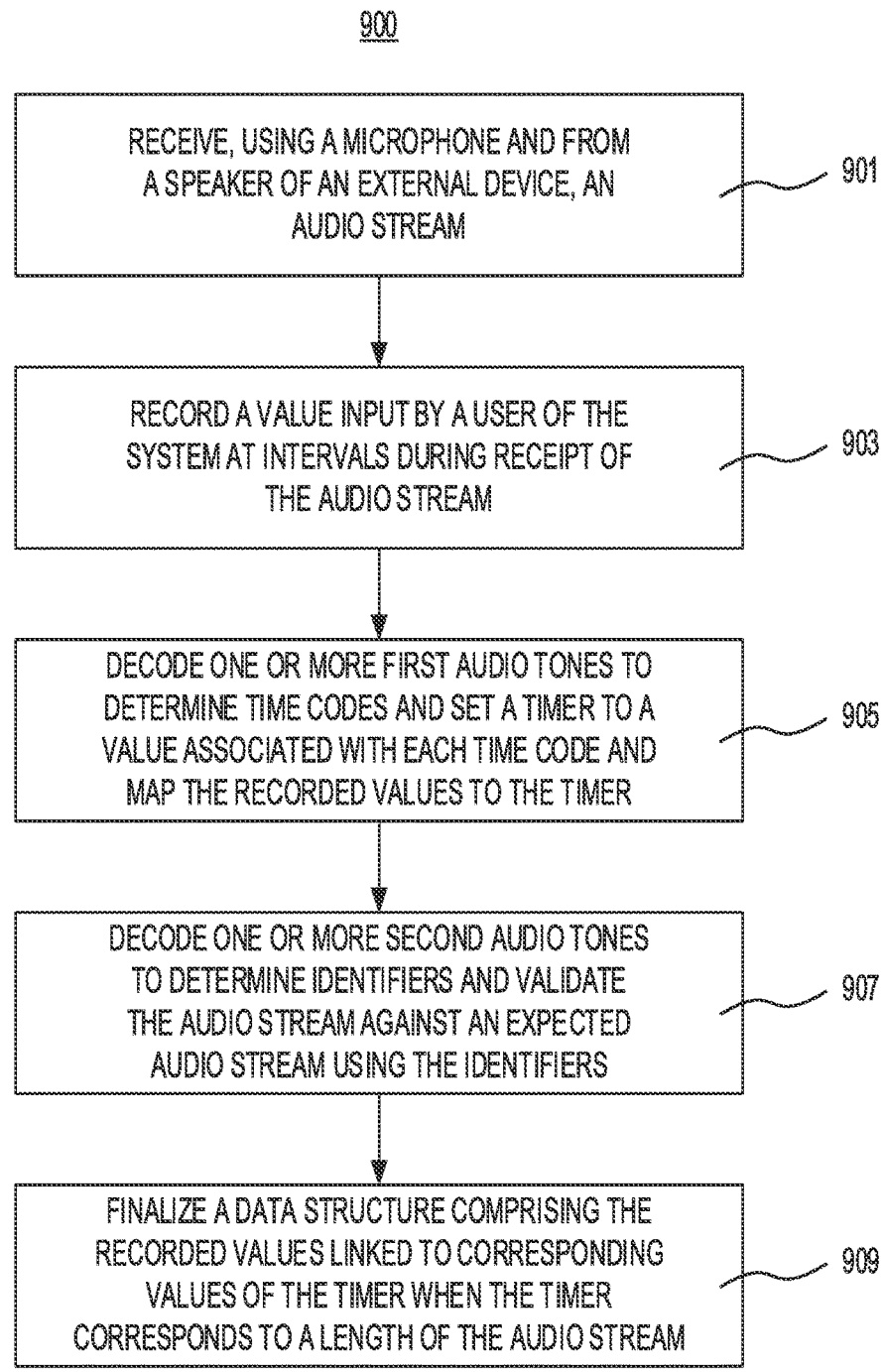
FIG. 9 is a flowchart of the exemplary method of FIG. 8, according to some embodiments of the present disclosure.

FIG. 9 is a flowchart of an exemplary method 900 for synchronizing devices using audio signals. Accordingly, method 900 may comprise an embodiment of method 800 of FIG. 8. Method 900 may be implemented using at least one processor that may form part of a user device (e.g., processor 1605 of device 1600 of FIG. 16B).

At step 901, the processor may receive, using a microphone and from a speaker of an external device, an audio stream. For example, the external device may comprise a television (such as television 1700 of FIG. 17), a radio (such as radio 1800 of FIG. 18A or radio 1850 of FIG. 18B), or any other external device having speakers to transmit audio waves to the microphone.

At step 903, the processor may record, at intervals, values input by a user of the system during receipt of the audio stream. For example, the value may have been input using a graphical user interface (GUI) displaying a dial such that the user may input a value corresponding to the user's reaction to content including the received audio. Additionally or alternatively, the user may use one or more input devices (such as a keyboard, a joystick, or the like) to input the value to the processor. The processor may record values at regular intervals, such as every half second, every second, every 2 seconds, every 3 seconds, or the like. Additionally or alternatively, the processor may capture an input value during at least one irregular interval. For example, the processor may capture a first input value and second input value at times differing by one second while a second input value and third input value may be captured at times differing by two seconds. In such an example, the processor may also capture other input values within intervals of two seconds or may have further irregular intervals therebetween.

At step 905, the processor may decode one or more first audio tones within the audio stream to determine time codes. For example, the audio tones may encode regular time codes, such as every half second, every second, every 2 seconds, every 3 seconds, or the like. Additionally or alternatively, the audio tones may encode at least one irregular time code. For example, a first and second audio tone may be separated by one second while a second and third audio tone may be separated by two seconds. In such an example, other audio tones may also be separated by two seconds or may have further irregular intervals therebetween. As explained above, the audio tones may encode the time codes by comprising audio waves whose digital representations also represent the time codes. Additionally or alternatively, the audio tones may encode the time codes by comprising audio waves that are representative waves that may be matched to the predetermined time codes using an index of representative waves (e.g., stored in software layer 103 of FIG. 1A and/or in server 105 of FIG. 1A). Additionally or alternatively, the audio tones may encode the time codes by comprising audio waves whose digital representations may be matched to the predetermined time codes using an index of digital representations (e.g., stored in software layer 103 of FIG. 1A and/or in server 105 of FIG. 1A). Furthermore, in response to determining each time code, the processor may set a timer to a value of the time code and map the recorded values to the timer.

At step 907, the processor may decode one or more second audio tones within the audio stream to determine identifiers. For example, the second audio tones may encode the identifiers similar to how the first audio tones encode the audio tones, as described above in step 905.

In some embodiments, the second audio tones may be evenly spaced between first audio tones. Additionally or alternatively, one or more of the second audio tones may be offset from the first audio tones (e.g., being embedded in the received audio one second after a first audio tone such that the next first audio tone is more than one second after the second audio tone, being embedded in the received audio two seconds after a first audio tone such that the next first audio tone is less than two seconds after the second audio tone, or the like). Additionally or alternatively, the spacing between first and second audio tones may vary. Additionally or alternatively, the received audio may include other regular patterns of first and second audio tones (such as two first audio tones followed by a single second audio tone, one first audio tone followed by two second audio tones, or the like) and/or irregular sequences of first and second audio tones (such as two first audio tones followed by one single second audio tone followed by one single first audio tone, or other irregular sequences).

Furthermore, using the identifiers, the processor may validate the audio stream against an expected audio stream. For example, a user of the processor and/or a remote server (e.g., server 105 of FIG. 1A) may initiate a test using the processor relating to the expected audio stream (and/or the identifier thereof). If the audio tone encoding the identifier does not map to the expected audio stream, the processor may pause recording with the microphone and/or pause accepting input from the user. Additionally or alternatively, the processor may a notify the user of the error. For example, the notification may include a first option to cancel recording and a second option to continue recording. The second option may result in the processor trying to resume recording and/or accepting input such that the processor will again attempt to verify against the expected audio stream when the next audio tone is received. If the next audio tone encoding the identifier maps to the expected audio stream, the processor may continue executing method 900. If any gaps in recorded values are present on account of the pause in step 907, the processor may null out such gaps (e.g., with gap-filling zeros) or may fill such gaps using linear, quadratic, logistic, or other extrapolation from one or more values immediately preceding the gap and/or one or more values immediately after the gap.

At step 909, the processor may finalize a data structure comprising the recorded values linked to corresponding values of the timer when the timer corresponds to a length of the audio stream. For example, the data structure may comprise a relational data structure (e.g., a tabular data structure) mapping the recorded values to the values of the timer corresponding to the recorded values. For example, the values of the timer may be based on the resets described above in step 905. In some embodiments, the processor may send the data structure with unaltered timestamps and corresponding timer values, e.g., with a raw mapping rather than a correlated mapping.

Method 900 may include further steps. For example, the processor may transmit the finalized data structure to a remote server (e.g., server 150 of FIG. 1A). Additionally or alternatively, when the value of the timer corresponds to a length of the content, which the processor may have received from the remote server in addition to the expected audio stream (and/or an identifier thereof), the processor may halt recording of the audio and/or halt receiving input from the user. For example, the processor may display a message to the user indicating that the test is finished.

Figure 10A:
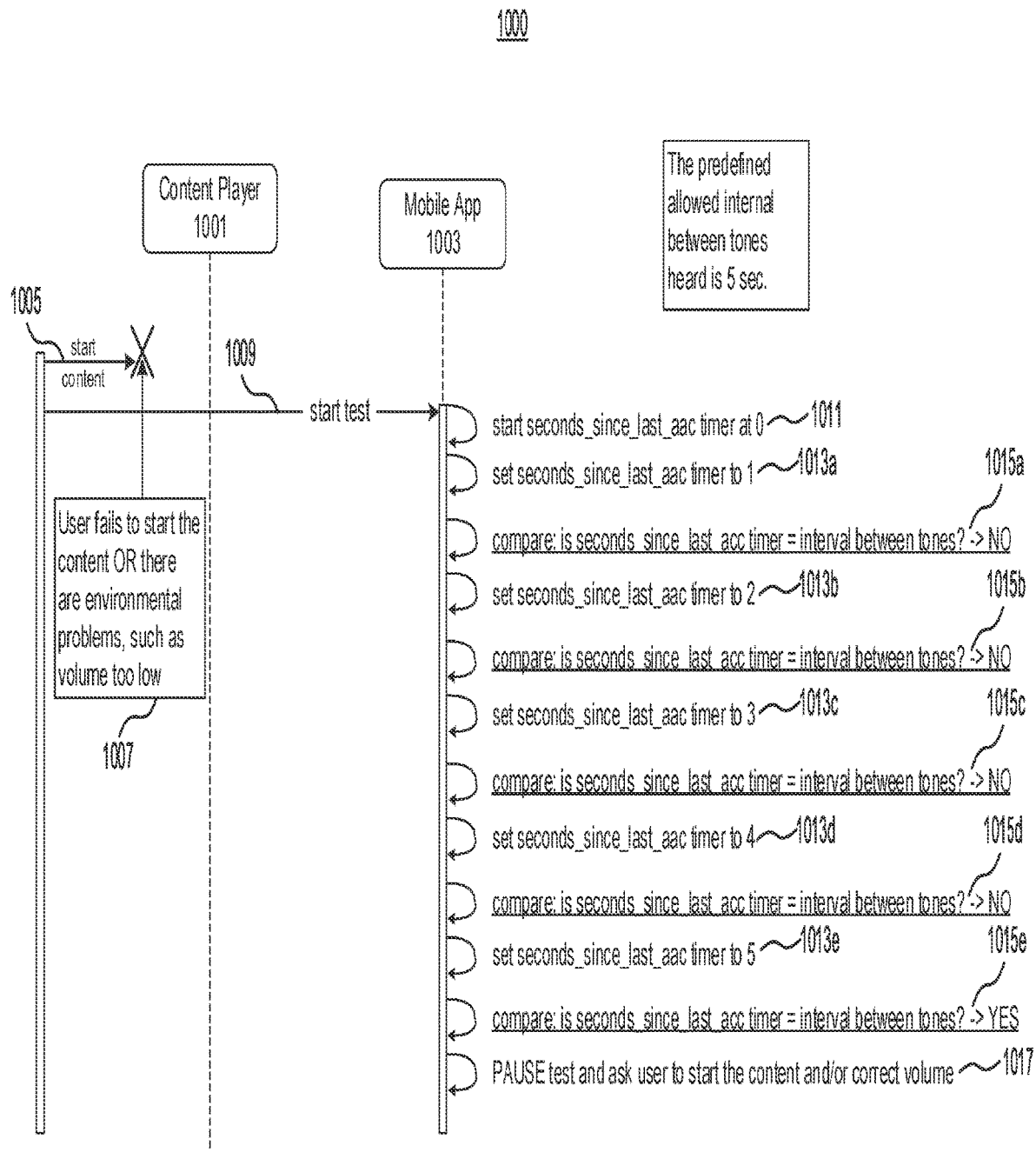
FIGS. 10A and 10B are graphical depictions of an exemplary method for processing pauses of content while synchronizing devices using audio signals, according to some embodiments of the present disclosure.

FIG. 10A is a graphical depiction of an exemplary method 1000 for processing pauses of content while synchronizing devices using audio signals. Method 1000 may be used in combination with one or more of methods 200, 400, 600, and/or 800 of FIGS. 2, 4, 6, and 8, respectively. As depicted in FIG. 10A, method 1000 may be performed using a content player 1001, which may comprise player device 107 of FIG.

1A, and a mobile application 1003, which may be executed by listener device 101 of FIG. 1A.

As depicted in FIG. 10A at step 1005, mobile application 1003 may receive (e.g., using a microphone of listener device 107) audio from content player 1001. However, as shown in the example of FIG. 10A at step 1007, mobile application 1003 may fail to or otherwise receive only part of the audio, e.g., due to low volume from content player 1001, due to high ambient noise, due to poor acoustic conditions, or the like. Accordingly, even though the audio may include audio tones encoding identifiers and/or time codes, as explained above, mobile application 1003 may fail to decode the corresponding identifiers and/or time codes.

Mobile application 1003 may have received, from a user and/or a remote server (not shown in FIG. 10A), initiation of a test using mobile application 1003 at step 1009. At the initiation of the test, mobile application 1003 may initiate a counter at step 1011. Mobile application 1003 may increment the counter (e.g., every half second, every second, every two seconds, or the like), e.g., at steps 1013a-1013e, as long as mobile application 1003 does not receive an audio tone corresponding to an identifier and/or a time code. Whenever the counter exceeds a threshold (5 seconds in the example of FIG. 10A, but any threshold may be used such as 4 seconds or less, 6 seconds or more, etc.), e.g., shown as comparison steps 1015a-1015e, mobile application 1003 may throw an exception at step 1017. As used herein, an "exception" may refer to an exception in a programming language, such as C++, Java, or the like, or may refer to a broader indication of an error (e.g., using a message displayed to the user of mobile application 1003 or the like). For example, mobile application 1003 may cancel recording (e.g., recording audio using the microphone and/or recording values input by the user, as explained above). Additionally or alternatively, mobile application 1003 may notify the user, e.g., by providing the user a first option to cancel recording and a second option to continue recording.

Figure 10B:
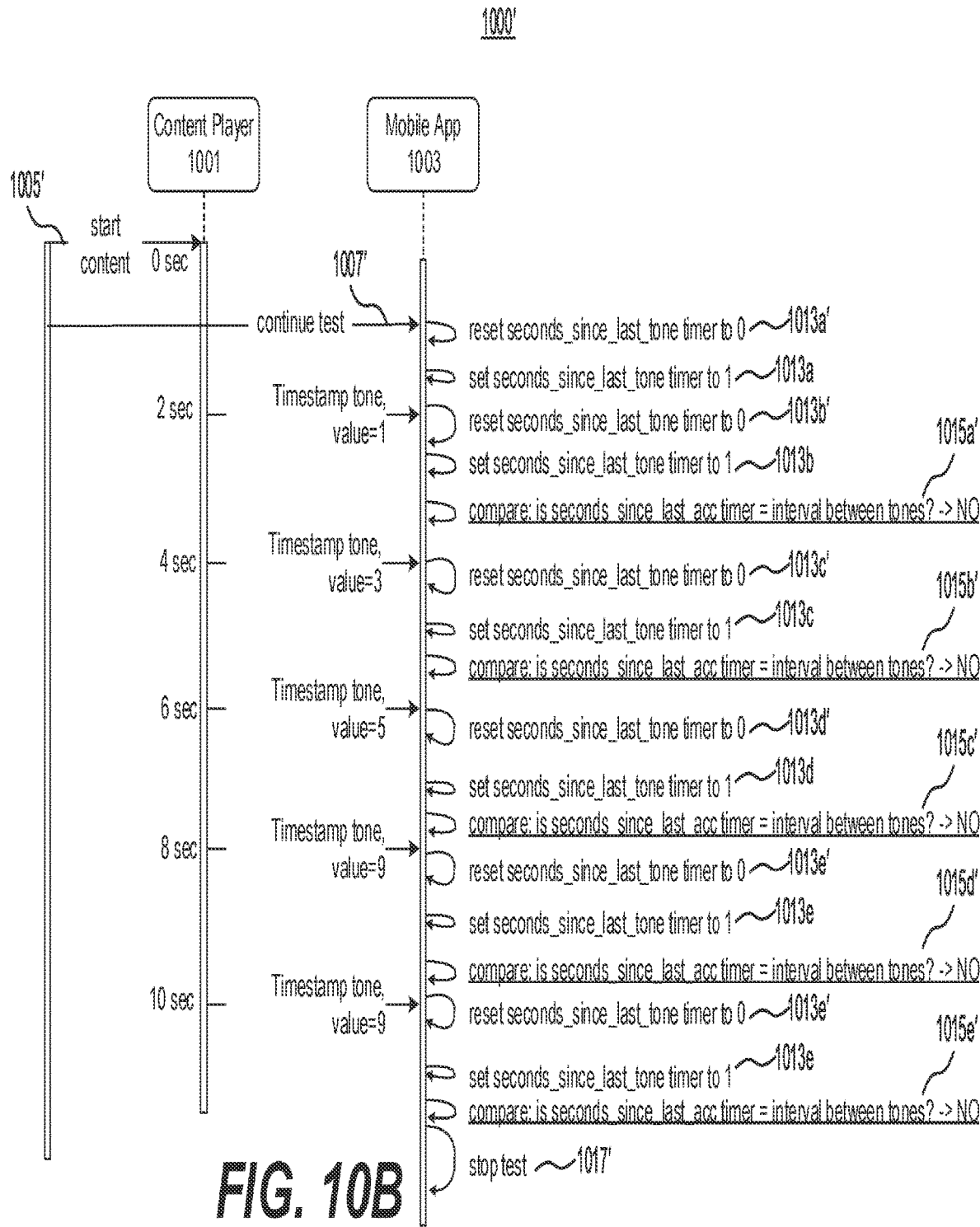

FIG. 10B is a graphical depiction of an exemplary method 1000' for processing pauses of content while synchronizing devices using audio signals. Method 1000' may be used in combination with one or more of methods 200, 400, 600, and/or 800 of FIGS. 2, 4, 6, and 8, respectively. As depicted in FIG. 10B, method 1000' may be performed using a content player 1001, which may comprise player device 107 of FIG. 1A, and a mobile application 1003, which may be executed by listener device 101 of FIG. 1A.

As depicted in FIG. 10B, mobile application 1003 may receive (e.g., using a microphone of listener device 107) audio from content player 1001 at step 1005'. Unlike the example of FIG. 10A, mobile application 1003 may receive the audio. Accordingly, mobile application 1003 may decode audio tones embedded in the audio that encode identifiers and/or time codes, as explained above.

Similar to FIG. 10A, mobile application 1003 may have received, from a user and/or a remote server (not shown in FIG. 10B), initiation of a test using mobile application 1003 at step 1007'. At the initiation of the test, mobile application 1003 may initiate a counter. Mobile application 1003 may increment the counter (e.g., every half second, every second, every two seconds, or the like) as long as mobile application 1003 does not receive an audio tone corresponding to an identifier and/or a time code, e.g., at steps 1013a-1013e. Because the counter exceeds a threshold (5 seconds in the example of FIG. 10B, but any threshold may be used such as 4 seconds or less, 6 seconds or more, etc.), mobile application 1003 may continue to record audio and process audio tones embedded therein. Although FIG. 10A follows method 400 of FIG. 4, method 200, 600, and/or 800 of FIGS. 2, 6, and/or 8, respectively, may be used instead. Moreover, mobile application 1003 may reset the counter each time an audio tone is decoded, e.g., at steps 1013a'-1013e'. When the test is complete (e.g., using a different timer as explained above), mobile application 1003 may halt recording of the audio and/or halt receiving input from the user at step 1017'. For example, mobile application 1003 may display a message to the user indicating that the test is finished.

Figure 11:
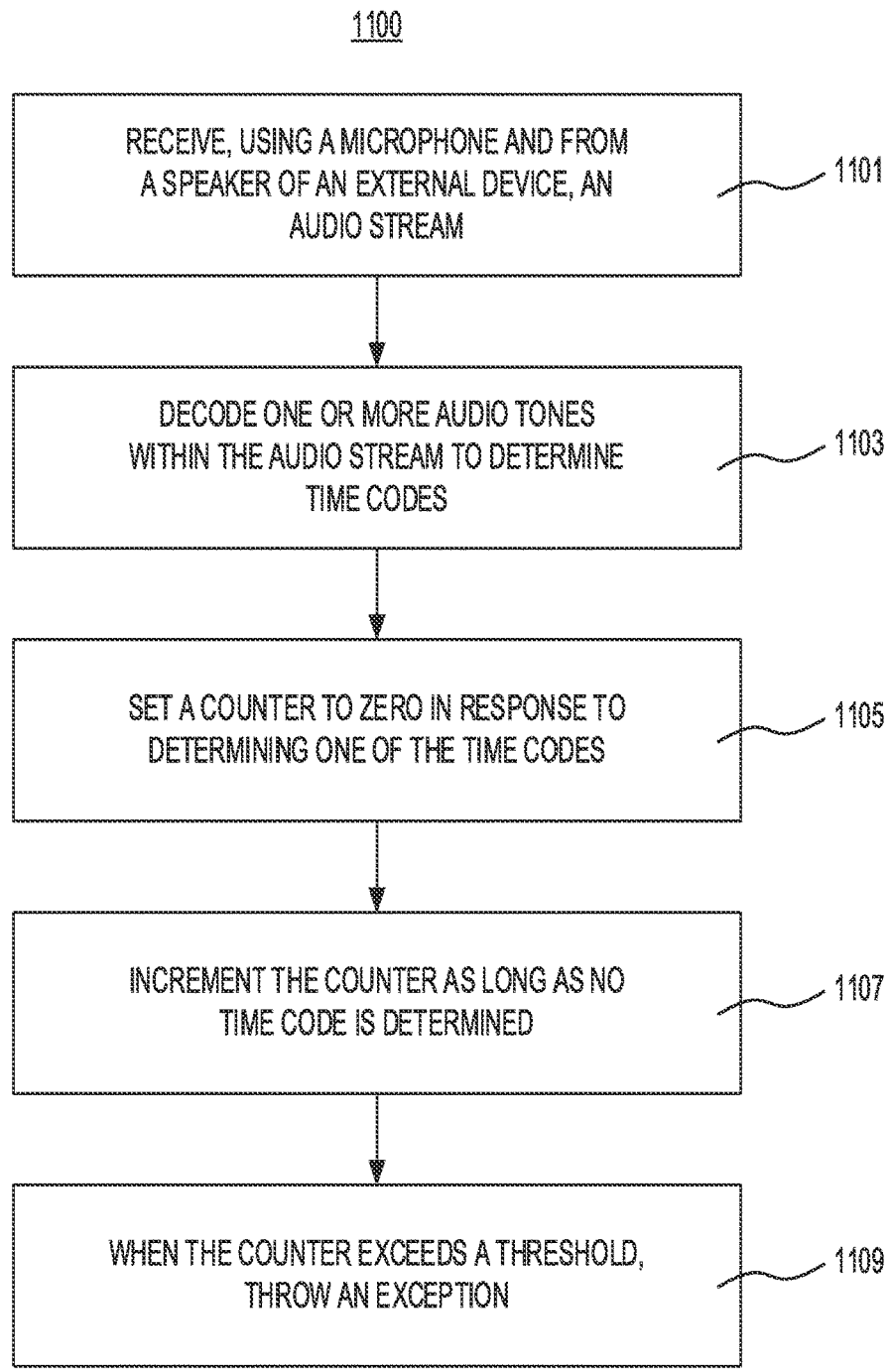
FIG. 11 is a flowchart of the exemplary method of FIGS. 10A and 10B, according to some embodiments of the present disclosure.

FIG. 11 is a flowchart of an exemplary method 1100 for processing pauses of content while synchronizing devices using audio signals. Accordingly, method 1100 may comprise an embodiment of method 1000 of FIG. 10A. Method 1100 may be implemented using at least one processor that may form part of a user device (e.g., processor 1605 of device 1600 of FIG. 16B).

At step 1101, the processor may receive, using a microphone and from a speaker of an external device, an audio stream. For example, the external device may comprise a television (such as television 1700 of FIG. 17), a radio (such as radio 1800 of FIG. 18A or radio 1850 of FIG. 18B), or any other external device having speakers to transmit audio waves to the microphone.

At step 1103, the processor may decode one or more audio tones within the audio stream to determine time codes. For example, the audio tones may encode regular time codes, such as every half second, every second, every 2 seconds, every 3 seconds, or the like. Additionally or alternatively, the audio tones may encode at least one irregular time code. For example, a first and second audio tone may be separated by one second while a second and third audio tone may be separated by two seconds. In such an example, other audio tones may also be separated by two seconds or may have further irregular intervals therebetween. As explained above, the audio tones may encode the time codes by comprising audio waves whose digital representations also represent the time codes. Additionally or alternatively, the audio tones may encode the time codes by comprising audio waves that are representative waves that may be matched to the predetermined time codes using an index of representative waves (e.g., stored in software layer 103 of FIG. 1A and/or in server 105 of FIG. 1A). Additionally or alternatively, the audio tones may encode the time codes by comprising audio waves whose digital representations may be matched to the predetermined time codes using an index of digital representations (e.g., stored in software layer 103 of FIG. 1A and/or in server 105 of FIG. 1A).

At step 1105, the processor may set a counter to zero in response to determining one of the time codes. Additionally or alternatively, the processor may set the counter to zero in response to a user and/or a remote server (e.g., server 105 of FIG. 1A) initiating a test using the processor.

At step 1107, the processor may increment the counter as long as no time code is determined. For example, the processor may increment the counter every half second, every second, every two seconds, or the like.

At step 1109, when the counter exceeds a threshold, the processor may throw an exception. For example, the processor may cancel recording (e.g., recording audio using the microphone and/or recording values input by the user to the processor). Additionally or alternatively, the processor may notify the user, e.g., by providing the user a first option to cancel recording and a second option to continue recording, as explained above with respect to methods 200, 600, and 800 of FIGS. 2, 6, and 8, respectively.

Figure 12:
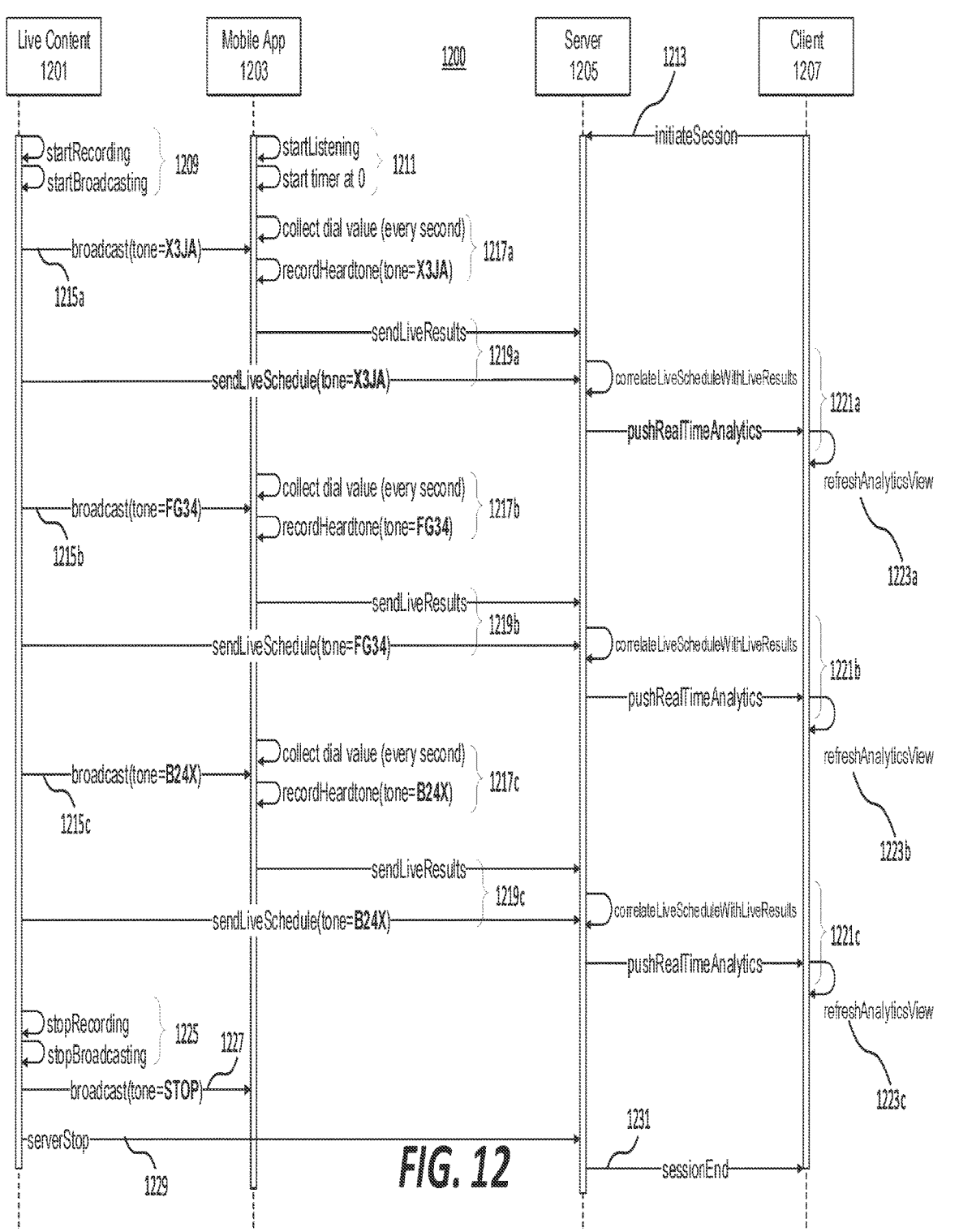
FIG. 12 is a graphical depiction of an exemplary method for synchronizing a device to live content using audio signals, according to some embodiments of the present disclosure.

FIG. 12 is a graphical depiction of an exemplary method 1200 for synchronizing a device to live content using audio signals. As depicted in FIG. 12, method 1200 may be performed using live content 1201, which may comprise live content 151 of FIG. 1B, a mobile application 1203, which may be executed by device 153a, 153b, and/or 153c of FIG. 1B, a remote server 1205, which may comprise server(s) 155 of FIG. 1B, and a client 1207, which may comprise client device 157 of FIG. 1B.

As depicted in FIG. 12, mobile application 1203 may receive audio of live content 1201, e.g., using a microphone device(s) 153a, 153b, and/or 153c, broadcast in step 1209. In the example of FIG. 12, live content 1201 comprises a live speech, live play, live television broadcast, or other event that is simultaneous recorded by a master recorder. In other examples, live content 1201 may only be transmitted rather than recorded as well.

As shown in FIG. 12, the audio of live content 1201 may include audio tones (e.g., X3JA, FG34, and B24X as depicted in the example of FIG. 12), e.g., broadcast at steps 1215a-1215c. As explained above with respect to FIG. 1B, these tones may be embedded by a broadcaster of live content 1201 (e.g., by a television station, a radio station, or the like). Additionally or alternatively, these tones may be added on-demand to the audio from speakers conveying the audio of live content 1201 by an engineer (e.g., the engineer inputting a command to a sound system including the speakers at moments that engineer determines the tones are desirable).

In the example of FIG. 12, a variation of method 400 of FIG. 4 is implemented. However, in other embodiments not shown, method 1200 may also use audio tones with identifiers, as in methods 200, 600, and/or 800 of FIGS. 2, 6, and/or 8, respectively. Additionally or alternatively, method 1200 of FIG. 12 may incorporate the pausing technique depicted in FIGS. 10A and 10B.

As depicted in FIG. 12, a user and/or a remote server (not shown in FIG. 12) may initiate a test using mobile application 1203 relating to the live content (and/or an identifier thereof) at step 1211. In some embodiments, as depicted in FIG. 12, mobile application 1203 may initialize a timer at step 1211. Moreover, in some embodiments, client 1207 may initiate a session with server 1205, e.g., by using an API call, opening a port, or initiating a network session.

As depicted in FIG. 12, in method 1200, mobile application 1203 records values input by a user at intervals, e.g., at steps 1217a-1217c. For example, the value may have been input using a graphical user interface (GUI) displaying a dial such that the user may input a value corresponding to the user's reaction to live content 1201. Additionally or alternatively, the user may use one or more input devices (such as a keyboard, a joystick, or the like) to input the value to mobile application 1203. In the example of FIG. 12, mobile application 1203 captures an input value every 1 second. However, other regular intervals, such as every half second, every 2 seconds, every 3 seconds, or the like may also be used. Additionally or alternatively, mobile application 1203 may capture an input value during at least one irregular interval. For example, a first input value and second input value may be captured at times differing by one second while a second input value and third input value may be captured at times differing by two seconds. In such an example, other input values may also be captured within intervals of two seconds or may have further irregular intervals therebetween.

As further depicted in FIG. 12, mobile application 1203 may decode the audio tones described above, e.g., at steps 1217a-1217c. In the example of FIG. 12, the audio tones encode a time code relate to a timestamp at which a broadcaster or engineer of live content 1201 sent the audio tone. In some embodiments, the broadcaster or engineer may transmit audio tones at regular intervals, such as every half second, every 1 second, every 2 seconds, every 3 seconds, or the like. Additionally or alternatively, the broadcaster or engineer may transmit at least one audio tone at an irregular interval. For example, a first and second audio tone may be separated by one second while a second and third audio tone may be separated by two seconds. In such an example, other audio tones may also be separated by two seconds or may have further irregular intervals therebetween. As explained above, the audio tones may encode the time codes by comprising audio waves whose digital representations also represent the time codes. Additionally or alternatively, the audio tones may encode the time codes by comprising audio waves that are representative waves that may be matched to the predetermined time codes using an index of representative waves (e.g., stored in devices 153a, 153b, and/or 153c and/or stored on server(s) 155 of FIG. 1B). Additionally or alternatively, the audio tones may encode the time codes by comprising audio waves whose digital representations may be matched to the predetermined time codes using an index of digital representations (e.g., stored in devices 153a, 153b, and/or 153c and/or stored on server(s) 155 of FIG. 1B).

In some embodiments, mobile application 1203 may reset a timer to correspond to a value associated with each decoded time code and record the decoded time codes in associated with the captured input values, as in method 400. In other embodiments, as depicted in FIG. 12, mobile application 1203 may finalize a data structure comprising the recorded values linked to corresponding timestamps upon receipt of each audio tone, e.g., at steps 1219a-1219c. For example, the data structure may comprise a relational data structure (e.g., a tabular data structure) mapping the timestamps corresponding to the recorded values. In some embodiments, mobile application 1203 may correlate the timestamps associated with the captured values to the decoded time code from the received audio tone. In other embodiments, as shown in FIG. 12, mobile application 1203 may send the data structure with unaltered timestamps and corresponding recorded values to server 1205. Accordingly, remote server 1205 may perform the correlation, e.g., at steps 1221a-1221c.

In the example of FIG. 12, a broadcaster or engineer of live content 1201 may also send a data structure defining at least a portion of a schedule of live content 1201 to remote server 1205 after transmitting each audio tone, e.g., at steps 1219a-1219c. For example, the data structure may comprise a relational data structure (e.g., a tabular data structure) mapping timestamps to at least one time code. Accordingly, server 1205 may determine a timestamp from mobile device 1203 that corresponds to a timestamp (from the broadcaster or engineer) of at least one time code and adjust the remaining portions of the finalized data structure from mobile application 1203 accordingly.

Accordingly, in one example, server 1205 may correlate the recorded values with the received schedule by shifting at least one recorded value to align with the timestamp corresponding to the at least one time code. Additionally or alternatively, server 1205 may correlate the recorded values with the received schedule by removing at least one recorded value such that the remaining recorded values align with the timestamp corresponding to the at least one time code. In one example, server 1205 may select the at least one recorded value for removal based on one or more smoothing algorithms (e.g., additive smoothing, a Butterworth filter, a digital filter, linear smoothing, exponential smoothing, a Kalman filter, a kernel smoother, a Kolmogorov-Zurbenko filter, Laplacian smoothing, local regression, a low-pass filter, a high-pass filter, a moving average, a Ramer-Douglas-Peucker algorithm, a Savitzky-Golay smoothing filter, a smoothing spline, or the like) applied to neighboring recorded values. In another example, server 1205 may select the at least one recorded value for removal based on which recorded value is closest to or furthest from, in time, the at least one time code.

In some embodiments, as depicted in FIG. 12, mobile application 1203 may send a finalized data structure upon receipt of each audio tone. In other embodiments, mobile application 1203 may send a finalized data structure with a plurality of associated time codes. Accordingly, server 1205 may correlate the recorded values with the received schedule by shifting the recorded values and/or removing at least one recorded value such that the remaining recorded values align with the timestamps corresponding to plurality of time codes. If the at least one recorded value is earlier in time than the plurality of time codes, server 1205 may select the at least one recorded value for removal based on which recorded value is closest to or furthest from, in time, the time code earlier in time. If the at least one recorded value is later in time than the plurality of time codes, server 1205 may select the at least one recorded value for removal based on which recorded value is closest to or furthest from, in time, the time code latest in time. If the at least one recorded value is between two time codes in the plurality of time codes, server 1205 may select the at least one recorded value for removal based on which recorded value is closest to or furthest from, in time, the time code immediately previous in time than the at least one recorded value. Additionally or alternatively, server 1205 may select the at least one recorded value for removal based on which recorded value is closest to or furthest from, in time, the time code immediately later in time than the at least one recorded value.

As shown in FIG. 12, server 1205 may correlate received data structures on-demand such that the correlated data is displayed to client 1207 in real-time at steps 1223*a*-1223*c*. For example, server 1205 may send a table of values, a line graph of results over time, a bar graph of statistical measures of the results, or the like, to a screen of the device client 1207 is using (e.g., client device 157 of FIG. 1B).

When live content 1201 terminates at step 1225 (and, e.g., the broadcaster or engineer sends a stop audio tone to mobile application 1203 at step 1227 and a digital signal indicating termination to server 1205 at step 1229), mobile application 1203 may halt recording of audio and/or recording of values, and server 1205 may close an API call or a port or terminate a network session with mobile application 1203*a*. In some embodiments, server 1205 may send a message to client 1207 indicating live content 1201 has ended at step 1231.

Figure 13A:
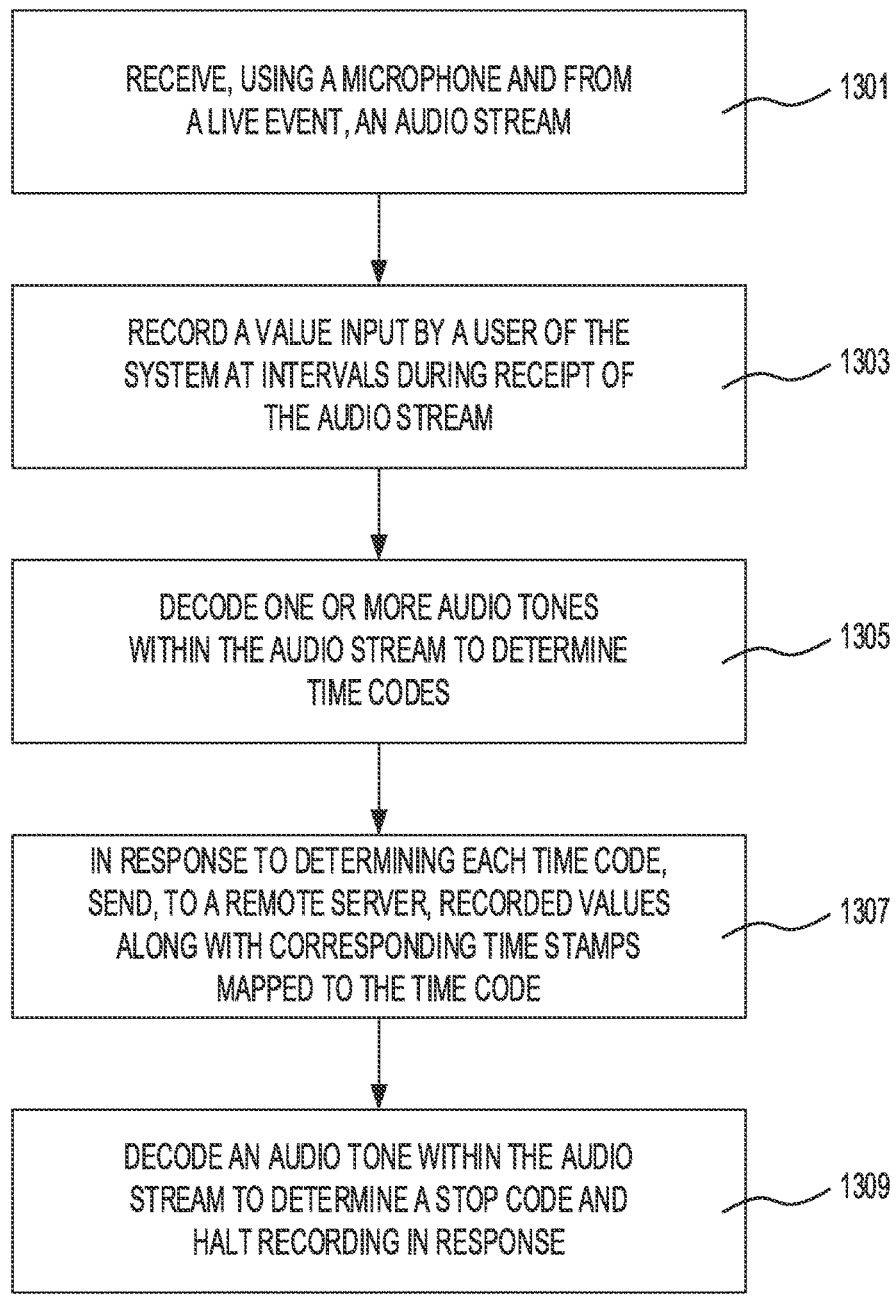
FIG. 13A is a flowchart of the exemplary method of FIG. 12 as performed by a user device, according to some embodiments of the present disclosure.

FIG. 13A is a flowchart of an exemplary method 1300 for synchronizing a device to live content using audio signals. Accordingly, method 1300 may comprise an embodiment of method 1200 of FIG. 12. Method 1300 may be implemented using at least one processor that may form part of a user device (e.g., processor 1605 of device 1600 of FIG. 16B).

At step 1301, the processor may receive, using a microphone and from a live event, an audio stream. For example, the live content may comprise a live broadcast of a sporting event, a live speech, a live play, or any other live content such as live content 151 of FIG. 1B.

At step 1303, the processor may record, at intervals, values input by a user of the system during receipt of the audio stream. For example, the value may have been input using a graphical user interface (GUI) displaying a dial such that the user may input a value corresponding to the user's reaction to content including the received audio. Additionally or alternatively, the user may use one or more input devices (such as a keyboard, a joystick, or the like) to input the value to the processor. The processor may record values at regular intervals, such as every half second, every second, every 2 seconds, every 3 seconds, or the like. Additionally or alternatively, the processor may capture an input value during at least one irregular interval. For example, the processor may capture a first input value and second input value at times differing by one second while a second input value and third input value may be captured at times differing by two seconds. In such an example, the processor may also capture other input values within intervals of two seconds or may have further irregular intervals therebetween.

At step 1305, the processor may decode one or more audio tones within the audio stream to determine time codes. For example, as explained above, the audio tones encode a time code relate to a timestamp at which a broadcaster or engineer of the live event sent the audio tone. The broadcaster or engineer may send the audio tones at regular intervals, such as every half second, every second, every 2 seconds, every 3 seconds, or the like. Additionally or alternatively, the broadcaster or engineer may send the audio tones across at least one irregular interval. For example, a first and second audio tone may be separated by one second while a second and third audio tone may be separated by two seconds. In such an example, other audio tones may also be separated by two seconds or may have further irregular intervals therebetween. As explained above, the audio tones may encode the time codes by comprising audio waves whose digital representations also represent the time codes. Additionally or alternatively, the audio tones may encode the time codes by comprising audio waves that are representative waves that may be matched to the predetermined time codes using an index of representative waves (e.g., stored in software layer 103 of FIG. 1A and/or in server 105 of FIG. 1A). Additionally or alternatively, the audio tones may encode the time codes by comprising audio waves whose digital representations may be matched to the predetermined time codes using an index of digital representations (e.g., stored in software layer 103 of FIG. 1A and/or in server 105 of FIG. 1A).

At step 1307, the processor may, in response to determining each time code, send, to a remote server, recorded values input by the user along with corresponding time stamps mapped to the time code. As explained above, the processor and/or the remote server may correlate the recorded values to timestamps of a schedule for the live event using the time codes.

At step 1309, the processor may decode an audio tone within the audio stream to determine a stop code. Furthermore, in response to determining the stop code, the processor may halt recording of the values. Additionally or alternatively, the processor may halt recording of the audio and/or display a message to the user indicating that the live event is finished.

Figure 13B:
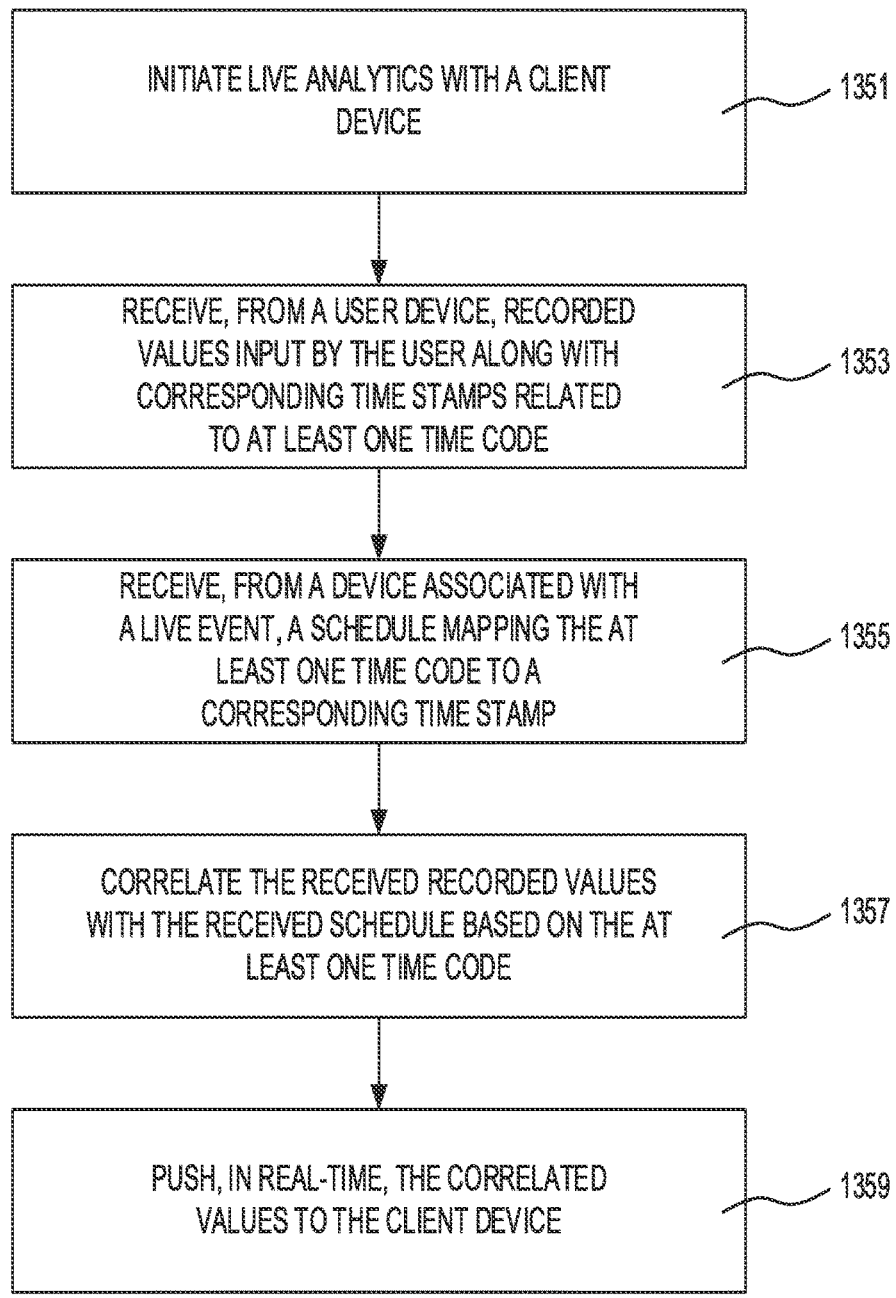
FIG. 13B is a flowchart of the exemplary method of FIG. 12 as performed by a remote server, according to some embodiments of the present disclosure.

FIG. 13B is a flowchart of an exemplary method 1350 for synchronizing a device to live content using audio signals. Accordingly, method 1350 may comprise an embodiment of method 1200 of FIG. 12. Method 1350 may be implemented using at least one processor that may form part of a server (e.g., processor 1901 of server 1900 of FIG. 19).

At step 1351, the processor may initiate a live analytics session with a client device. For example, the processor may open an API, a port, and/or a network connection with client device 157 of FIG. 1B in order to receive results from dial testing of a live event (e.g., in accordance with method 1300 of FIG. 13A, described above).

At step 1353, the processor may receive, from a user device, recorded values input by a user of the user device along with corresponding time stamps related to at least one time code. For example, the processor may open an API, a port, and/or a network connection with the user device in order to receive the recorded values. In some embodiments, the processor may receive a data structure comprising recorded values input by the user along with corresponding time stamps mapped to the at least one time code, as described above in step 1307 of method 1300 of FIG. 13A. In some embodiments, the user device may have correlated the corresponding time stamps to the at least one time code. In other embodiments, the user device may send the raw timestamps and at least one time code without any correlation or other post-processing.

At step 1355, the processor may receive, from a device associated with the live event, a schedule mapping the at least one time code to a corresponding time stamp. For example, the schedule may comprise a relational data structure (e.g., a tabular data structure) mapping timestamps to at least one time code.

At step 1357, the processor may correlate the received recorded values with the received schedule based on the at least one time code. For example, as explained above, the processor may determine a timestamp from the user device that corresponds to a timestamp (from a broadcaster or engineer of the live event) of at least one time code and adjust the remaining portions of the data structure from the user device accordingly.

In some embodiments, correlating the received recorded values with the received schedule may comprise shifting at least one recorded value to align with the at least one time code and/or removing at least one recorded value such that the remaining recorded values align with the at least one time code. In embodiments where the processor removes the at least on recorded value, the processor may select the at least one recorded value for removal based on one or more smoothing algorithms applied to neighboring recorded values. Additionally or alternatively, the processor may select the at least one recorded value for removal based on which recorded value is closest to or furthest from the at least one time code (e.g., based on time).

In some embodiments, the received data structure may include recorded values input by a user of the user device along with corresponding time stamps related to a plurality of time codes. In such embodiments, correlating the received recorded values with the received schedule may comprise shifting at least one recorded value to align with the plurality of time codes and/or removing at least one recorded value such that the remaining recorded values align with the plurality of time codes. In embodiments where the processor removes the at least on recorded value, and the at least one recorded value is earlier in time than the plurality of time codes, the processor may select the at least one recorded value for removal based on which recorded value is closest to or furthest from (e.g., based on time) the time code earliest in time. In embodiments where the processor removes the at least on recorded value, and the at least one recorded value is later in time than the plurality of time codes, the processor may select the at least one recorded value for removal based on which recorded value is closest to or furthest from (e.g., based on time) the time code latest in time. In embodiments where the processor removes the at least on recorded value, and the at least one recorded value is between two time codes in the plurality of time codes, the processor may select the at least one recorded value for removal based on which recorded value is closest to or furthest from (e.g., based on time) the time code immediately previous in time than the at least one recorded value or the time code immediately later in time than the at least one recorded value.

At step 1359, the processor may push, in real-time, the correlated values to the client device. For example, as explained above, the processor may send a table of values, a line graph of results over time, a bar graph of statistical measures of the results, or the like, to a screen of the client device (e.g., client device 157 of FIG. 1B).

Method 1350 may include further steps. For example, when the live event terminates, the broadcaster or engineer may send a stop audio tone to the user device and/or a digital signal indicating termination to the processor. Accordingly, the processor may close the API, close the port, and/or terminate the network session with the client device and/or with the user device. Additionally or alternatively, the processor may send a message to the client device and/or the user device indicating the live event has ended.

Figure 14:
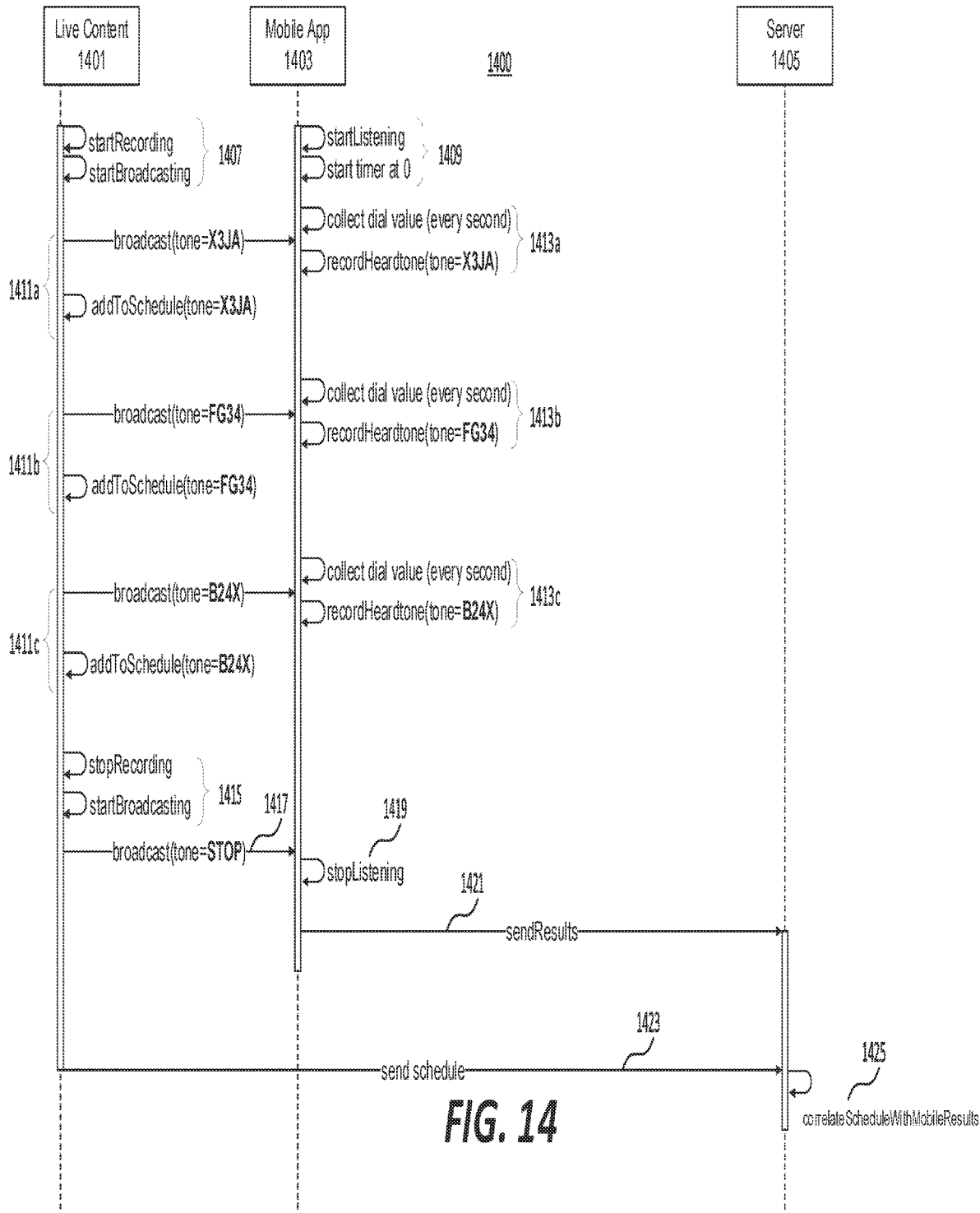
FIG. 14 is a graphical depiction of another exemplary method for synchronizing a device to live content using audio signals, according to some embodiments of the present disclosure.

FIG. 14 is a graphical depiction of an exemplary method 1400 for synchronizing a device to live content using audio signals. As depicted in FIG. 14, method 1400 may be performed using live content 1401, which may comprise live content 151 of FIG. 1B, a mobile application 1403, which may be executed by device 153a, 153b, and/or 153c of FIG. 1B, and a remote server 1405, which may comprise server(s) 155 of FIG. 1B. Although not depicted in FIG. 14, server 1405 may communicate with a client, such as client device 157 of FIG. 1B.

As depicted in FIG. 14, mobile application 1403 may receive audio of live content 1401, e.g., using a microphone device(s) 153a, 153b, and/or 153c, broadcast in step 1407. In the example of FIG. 14, live content 1401 comprises a live speech, live play, live television broadcast, or other event that is simultaneous recorded by a master recorder. In other examples, live content 1401 may only be transmitted rather than recorded as well.

As shown in FIG. 14, the audio of live content 1401 may include audio tones (e.g., X3JA, FG34, and B24X as depicted in the example of FIG. 14), e.g., broadcast at steps 1411a-1411c. As explained above with respect to FIG. 1B, these tones may be embedded by a broadcaster of live content 1401 (e.g., by a television station, a radio station, or the like). Additionally or alternatively, these tones may be added on-demand to the audio from speakers conveying the audio of live content 1401 by an engineer (e.g., the engineer inputting a command to a sound system including the speakers at moments that engineer determines the tones are desirable).

In the example of FIG. 14, a variation of method 400 of FIG. 4 is implemented. However, in other embodiments not shown, method 1400 may also use audio tones with identifiers, as in methods 200, 600, and/or 800 of FIGS. 2, 6, and/or 8, respectively. Additionally or alternatively, method 1400 of FIG. 14 may incorporate the pausing technique depicted in FIGS. 10A and 10B.

As depicted in FIG. 14, a user and/or a remote server (not shown in FIG. 14) may initiate a test using mobile application 1403 relating to the live content (and/or an identifier thereof) at step 1409. In some embodiments, as depicted in FIG. 14, mobile application 1403 may initialize a timer at step 1409.

As depicted in FIG. 14, in method 1400, mobile application 1403 records values input by a user at intervals, e.g., at steps 1413a-1413b. For example, the value may have been input using a graphical user interface (GUI) displaying a dial such that the user may input a value corresponding to the user's reaction to live content 1401. Additionally or alternatively, the user may use one or more input devices (such as a keyboard, a joystick, or the like) to input the value to mobile application 1403. In the example of FIG. 14, mobile application 1403 captures an input value every 1 second. However, other regular intervals, such as every half second, every 2 seconds, every 3 seconds, or the like may also be used. Additionally or alternatively, mobile application 1403 may capture an input value during at least one irregular interval. For example, a first input value and second input value may be captured at times differing by one second while a second input value and third input value may be captured at times differing by two seconds. In such an example, other input values may also be captured within intervals of two seconds or may have further irregular intervals therebetween.

As further depicted in FIG. 14, mobile application 1403 may decode the audio tones described above, e.g., at steps 1413a-1413c. In the example of FIG. 14, the audio tones encode a time code relate to a timestamp at which a broadcaster or engineer of live content 1401 sent the audio tone. In some embodiments, the broadcaster or engineer may transmit audio tones at regular intervals, such as every half second, every 1 second, every 2 seconds, every 3 seconds, or the like. Additionally or alternatively, the broadcaster or engineer may transmit at least one audio tone at an irregular interval. For example, a first and second audio tone may be separated by one second while a second and third audio tone may be separated by two seconds. In such an example, other audio tones may also be separated by two seconds or may have further irregular intervals therebetween. As explained above, the audio tones may encode the time codes by comprising audio waves whose digital representations also represent the time codes. Additionally or alternatively, the audio tones may encode the time codes by comprising audio waves that are representative waves that may be matched to the predetermined time codes using an index of representative waves (e.g., stored in devices 153a, 153b, and/or 153c and/or stored on server(s) 155 of FIG. 1B). Additionally or alternatively, the audio tones may encode the time codes by comprising audio waves whose digital representations may be matched to the predetermined time codes using an index of digital representations (e.g., stored in devices 153a, 153b, and/or 153c and/or stored on server(s) 155 of FIG. 1B).

In some embodiments, mobile application 1403 may reset a timer to correspond to a value associated with each decoded time code and/or, as depicted in FIG. 14, record the decoded time codes in associated with the captured input values and corresponding timestamps from mobile application 1403, as in method 400.

When live content 1401 terminates at step 1415 (and, e.g., the broadcaster or engineer sends a stop audio tone to mobile application 1403 at step 1417 and a digital signal indicating termination to server 1405), mobile application 1403 may halt recording of audio and/or recording of values at step 1419, and server 1405 may close an API call or a port or terminate a network session with mobile application 1403. In some embodiments, server 1405 may send a message to a client (not shown) indicating live content 1401 has ended.

In response to the stop audio tone, mobile application 1403 may finalize a data structure comprising the recorded values linked to corresponding timestamps upon receipt of each audio tone. For example, the data structure may comprise a relational data structure (e.g., a tabular data structure) mapping the timestamps corresponding to the recorded values. In some embodiments, mobile application 1203 may correlate the timestamps associated with the captured values to the decoded time code from the received audio tone. In other embodiments, as shown in FIG. 12, mobile application 1203 may send the data structure with unaltered timestamps and corresponding recorded values to server 1205 at step 1421. Accordingly, remote server 1205 may perform the correlation at step 1425.

For example, as depicted in FIG. 14, a broadcaster or engineer of live content 1401 may send a data structure defining at least a portion of a schedule of live content 1401 to remote server 1405 at step 1423 after live content 1401 ends. For example, the data structure may comprise a relational data structure (e.g., a tabular data structure) mapping timestamps to the time codes encoded in the audio tones. Accordingly, server 1405 may determine timestamps from mobile device 1403 that corresponds to timestamps (from the broadcaster or engineer) of the time codes and adjust the remaining portions of the finalized data structure from mobile application 1403 accordingly.

Accordingly, in one example, server 1405 may correlate the recorded values with the received schedule by shifting at least one recorded value to align with the timestamps corresponding to the time codes. Additionally or alternatively, server 1405 may correlate the recorded values with the received schedule by removing at least one recorded value such that the remaining recorded values align with the timestamps corresponding to the time codes. In one example, server 1405 may select the at least one recorded value for removal based on one or more smoothing algorithms (e.g., additive smoothing, a Butterworth filter, a digital filter, linear smoothing, exponential smoothing, a Kalman filter, a kernel smoother, a Kolmogorov-Zurbenko filter, Laplacian smoothing, local regression, a low-pass filter, a high-pass filter, a moving average, a Ramer-Douglas-Peucker algorithm, a Savitzky-Golay smoothing filter, a smoothing spline, or the like) applied to neighboring recorded values. In another example, server 1405 may select the at least one recorded value for removal based on which recorded value is closest to or furthest from, in time, the at least one of the time codes.

In some embodiments, mobile application 1403 may send a finalized data structure upon receipt of each audio tone. In other embodiments, as depicted in FIG. 14, mobile application 1403 may send a finalized data structure at the end of live content 1401 such that the finalized data structure is associated with a plurality of (or even all of the) time codes. Accordingly, server 1405 may correlate the recorded values with the received schedule by shifting the recorded values and/or removing at least one recorded value such that the remaining recorded values align with the timestamps corresponding to the time codes. If the at least one recorded value is earlier in time than all of the time codes, server 1405 may select the at least one recorded value for removal based on which recorded value is closest to or furthest from, in time, the time code earliest in time. If the at least one recorded value is later in time than all of the time codes, server 1405 may select the at least one recorded value for removal based on which recorded value is closest to or furthest from, in time, the time code latest in time. If the at least one recorded value is between two time codes of all of the time codes, server 1405 may select the at least one recorded value for removal based on which recorded value is closest to or furthest from, in time, the time code immediately previous in time than the at least one recorded value. Additionally or alternatively, server 1205 may select the at least one recorded value for removal based on which recorded value is closest to or furthest from, in time, the time code immediately later in time than the at least one recorded value.

Although not depicted in FIG. 14, server 1405 may send the correlated data such that it is displayed to a client (e.g., client device 157 of FIG. 1B). For example, server 1405 may send a table of values, a line graph of results over time, a bar graph of statistical measures of the results, or the like, to a screen of the device that the client is using (e.g., client device 157 of FIG. 1B).

Figure 15:
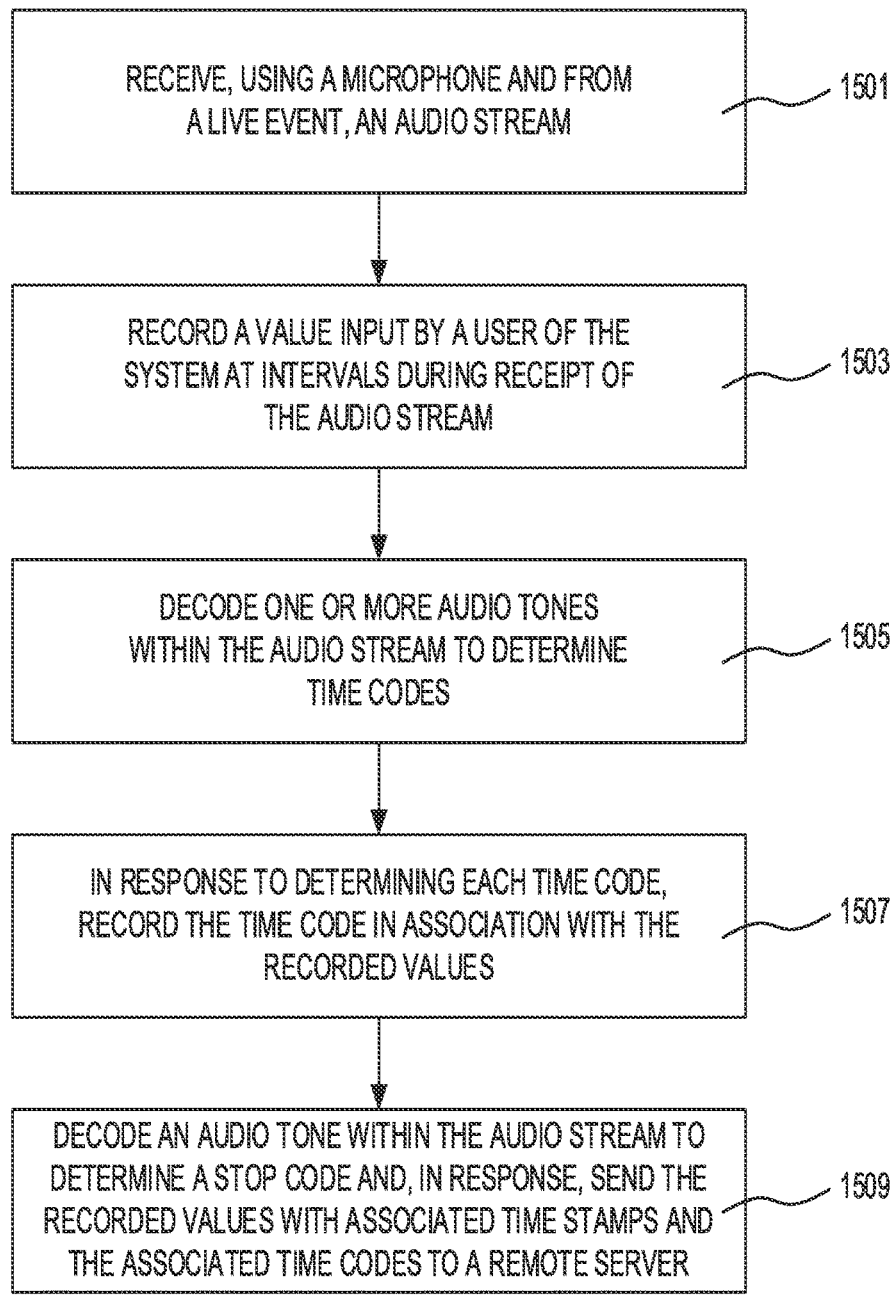
FIG. 15 is a flowchart of the exemplary method of FIG. 14, according to some embodiments of the present disclosure.

FIG. 15 is a flowchart of an exemplary method 1500 for synchronizing a device to live content using audio signals. Accordingly, method 1500 may comprise an embodiment of method 1400 of FIG. 14. Method 1500 may be implemented using at least one processor that may form part of a user device (e.g., processor 1605 of device 1600 of FIG. 16B).

At step 1501, the processor may receive, using a microphone and from a live event, an audio stream. For example, the live content may comprise a live broadcast of a sporting event, a live speech, a live play, or any other live content such as live content 151 of FIG. 1B.

At step 1503, the processor may record, at intervals, values input by a user of the system during receipt of the audio stream. For example, the value may have been input using a graphical user interface (GUI) displaying a dial such that the user may input a value corresponding to the user's reaction to content including the received audio. Additionally or alternatively, the user may use one or more input devices (such as a keyboard, a joystick, or the like) to input the value to the processor. The processor may record values at regular intervals, such as every half second, every second, every 2 seconds, every 3 seconds, or the like. Additionally or alternatively, the processor may capture an input value during at least one irregular interval. For example, the processor may capture a first input value and second input value at times differing by one second while a second input value and third input value may be captured at times differing by two seconds. In such an example, the processor may also capture other input values within intervals of two seconds or may have further irregular intervals therebetween.

At step 1505, the processor may decode one or more audio tones within the audio stream to determine time codes. For example, as explained above, the audio tones encode a time code relate to a timestamp at which a broadcaster or engineer of the live event sent the audio tone. The broadcaster or engineer may send the audio tones at regular intervals, such as every half second, every second, every 2 seconds, every 3 seconds, or the like. Additionally or alternatively, the broadcaster or engineer may send the audio tones across at least one irregular interval. For example, a first and second audio tone may be separated by one second while a second and third audio tone may be separated by two seconds. In such an example, other audio tones may also be separated by two seconds or may have further irregular intervals therebetween. As explained above, the audio tones may encode the time codes by comprising audio waves whose digital representations also represent the time codes. Additionally or alternatively, the audio tones may encode the time codes by comprising audio waves that are representative waves that may be matched to the predetermined time codes using an index of representative waves (e.g., stored in software layer 103 of FIG. 1A and/or in server 105 of FIG. 1A). Additionally or alternatively, the audio tones may encode the time codes by comprising audio waves whose digital representations may be matched to the predetermined time codes using an index of digital representations (e.g., stored in software layer 103 of FIG. 1A and/or in server 105 of FIG. 1A).

At step 1507, the processor may, in response to determining each time code, record the time code in association with the recorded values input by the user. As explained above, the processor may correlate the recorded values to timestamps of a schedule for the live event using the time codes. Alternatively, the processor may store the recorded time codes in associated with the recorded values and associated timestamps from the processor for later correlation by a remote server.

At step 1509, the processor may decode an audio tone within the audio stream to determine a stop code. Furthermore, in response to determining the stop code, the processor may halt recording and send, to a remote server, the recorded values input by the user along with corresponding time stamps and the associated time codes. For example, the remote server may correlate the recorded values to timestamps of a schedule for the live event using the time codes, as explained above. In some embodiments, the processor may additionally or alternatively halt recording of the audio and/or display a message to the user indicating that the live event is finished.

FIG. 16A is a depiction of exemplary device 1600 for use as an input device by a user (e.g., in response to content and/or a live event). As depicted in FIG. 16A, device 1600 may comprise a smartphone or tablet. Device 1600 may have a screen 1601. For example, screen 1601 may display one or more graphical user interfaces (GUIs) that allow a user of device 1600 to input values for recordation (e.g., as explained above in FIGS. 2-9, 12, 13A, 13B, 14, and 15). In certain aspects, screen 1601 may comprise a touchscreen to facilitate use of the one or more GUIs.

As further depicted in FIG. 16A, device 1600 may have one or more buttons, e.g., buttons 1603a and 1603b. For example, buttons 1603a and 1603b may facilitate use of one or more GUIs displayed on screen 1601.

FIG. 16B is a side view of interaction device 1600 of FIG. 16A. As depicted in FIG. 16B, device 1600 may have at least one processor 1605. For example, at least one processor 1605 may comprise a system-on-a-chip (SOC) adapted for use in a portable device, such as device 1600. Alternatively or concurrently, at least one processor 1605 may comprise any other type(s) of processor.

As further depicted in FIG. 16B, device 1600 may have one or more memories, e.g., memories 1607a and 1607b. In certain aspects, some of the one or more memories, e.g., memory 1607a, may comprise a volatile memory. In such aspects, memory 1607a, for example, may store one or more applications (or "apps") for execution on at least one processor 1605. For example, an app may include an operating system for device 1600 and/or an app for executing methods 300, 500, 700, 900, 1100, 1300, and/or 1500 of FIGS. 3, 5, 7, 9, 11, 13A, and/or 15, respectively. In addition, memory 1607a may store data generated by, associated with, or otherwise unrelated to an app in memory 1607a.

Alternatively or concurrently, some of the one or more memories, e.g., memory 1607b, may comprise a non-volatile memory. In such aspects, memory 1607b, for example, may store one or more applications (or "apps") for execution on at least one processor 1605. For example, as discussed above, an app may include an operating system for device 1600 and/or an app for executing methods 300, 500, 700, 900, 1100, 1300, and/or 1500 of FIGS. 3, 5, 7, 9, 11, 13A, and/or 15, respectively. In addition, memory 1607b may store data generated by, associated with, or otherwise unrelated to an app in memory 1607*b*. Furthermore, memory 1607*b* may include a pagefile, swap partition, or other allocation of storage to allow for the use of memory 1607*b* as a substitute for a volatile memory if, for example, memory 1607*a* is full or nearing capacity.

As depicted in FIG. 16B, device 1600 may include at least one network interface controller (NIC) (e.g., NIC 1607). NIC 1607 may be configured to facilitate communication over at least one computing network. Communication functions may thus be facilitated through one or more NICs. Although depicted in wireless in FIG. 16B and including radio frequency receivers and transmitters and/or optical (e.g., infrared) receivers and transmitters, NIC 1607 may alternatively be wired and include an Ethernet port or the like. The specific design and implementation of the one or more NICs depend on the computing network over which device 1600 is intended to operate. For example, in some embodiments, device 1600 may include one or more wireless and/or wired NICs designed to operate over a GSM network, a GPRS network, an EDGE network, a Wi-Fi or WiMax network, a Bluetooth® network, or the like. Alternatively or concurrently, device 1600 may include one or more wireless and/or wired NICs designed to operate over a TCP/IP network.

Figure 17:
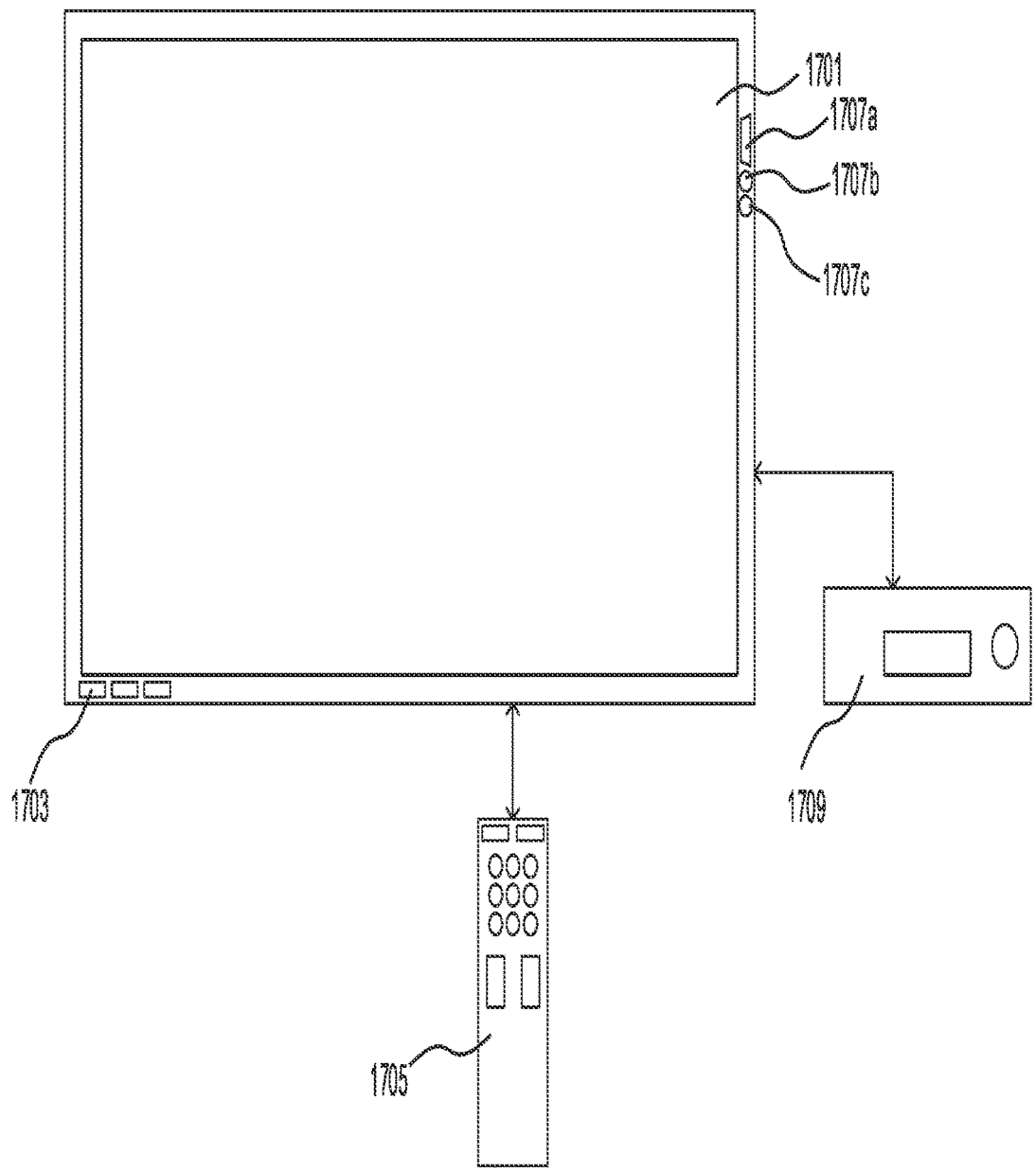
FIG. 17 is a depiction of an exemplary device for use as a content device, according to some embodiments of the present disclosure.

FIG. 17 is a depiction of exemplary device 1700 for use to broadcast content to a user (e.g., content player 201, 401, 601, 801, and/or 1001 of FIGS. 2, 4, 6, 8, and/or 10A and 10B, respectively). As depicted in FIG. 17, device 1700 may comprise a television. Device 1700 may have a screen 1701. For example, screen 1701 may display a media program or other content that allows a user using device 1700 to consume said program or content. Accordingly, a user may input values to a different device (e.g., device 1600 of FIGS. 16A and 16B) in response to consumption of said program or content from device 1700. In certain aspects, screen 1700 may comprise a touchscreen. Device 1700 may also have one or more speakers (not shown) for use in conveying content having both images and audio and/or solely audio-based content.

As further depicted in FIG. 17, device 1700 may have one or more buttons, e.g., button 1703. For example, button 1703 may facilitate use of one or more GUIs displayed on screen 1701. Alternatively or concurrently, device 1700 may be in operable connection with one or more remotes, e.g., remote 1705, to receive input from the user and/or facilitate use of one or more GUIs displayed on screen 1701. Remote 1705 may use buttons, voice commands, and/or other methods of receiving input from the user.

As further depicted in FIG. 17, device 1700 may have one or more ports, e.g., ports 1707*a*, 1707*b*, and 1707*c*, to connect external devices to device 1700 for sending signals to and from device 1700. For example, port 1707*a* may comprise a high-definition multimedia interface (HDMI) port, port 1707*b* may comprise a separate video (S-video) or composite video port, and port 1707*c* may comprise an RF connector port. Other ports such as universal serial bus (USB), video graphics array (VGA), aux-send, and the like may be included in the one or more ports of device 1700.

In some embodiments, device 1700 may be directly connected to a cable hookup (e.g., via coaxial cable) and receive a media program or other content therefrom. Device 1700 may show received programs and/or content on screen 1701 and/or play received programs and/or content on one or more speakers (not shown) for consumption by the user. Alternatively or concurrently, device 1700 may receive a media program or other content from an external device connected thereto.

One example of an external device in connection with device 1700 is cable box 1709 of FIG. 17. As used herein, the term "cable box" is not limited to devices that receive signals over coaxial cables but may also include devices that receive signals from a different associated medium such as over-the-air, satellite, and the like. Cable box 1709 may receive a media program or other content via an associated medium and then relay the media program or other content to device 1700 for consumption by the user.

Device 1700 (and/or cable box 1709) may also have at least one processor for execution of applications (or "apps"). For example, an app may include an operating system for device 1700 (and/or cable box 1709).

FIG. 18A is a depiction of another exemplary device 1800 for use to broadcast content to a user (e.g., content player 201, 401, 601, 801, and/or 1001 of FIGS. 2, 4, 6, 8, and/or 10A and 10B, respectively). As depicted in FIG. 18A, device 1800 may comprise a radio (such as a radio alarm clock). Accordingly, device 1800 may receive signals from a particular radio station selected based on one or more parameters (such as bandwidth). Device 1800 may have a screen 1801. For example, screen 1801 may display a clock and/or an identification of a current radio station being received.

As further depicted in FIG. 18A, device 1800 may have one or more buttons, e.g., volume button 1803, tuning button 1805, on button 1807, and off button 1809. For example, volume button 1803 may adjust a volume of content from the received signals from the particular radio station, and tuning button 1805 may adjust the one or more parameters selecting the particular radio station. On button 1807 may begin the receiving, and off button 1809 may terminate the receiving.

FIG. 18B is a depiction of an alternative embodiment 1850 of device 1800 of FIG. 18A. As depicted in FIG. 18B, device 1850 may comprise a vehicle radio. Accordingly, device 1850 may receive signals from a particular radio station selected based on one or more parameters (such as bandwidth). Device 1850 may have a screen 1851. For example, screen 1851 may display a clock and/or an identification of a current radio station being received.

As further depicted in FIG. 18B, device 1850 may have one or more knobs, e.g., volume knob 1853 and tuning knob 1855. For example, volume knob 1853 may adjust a volume of content from the received signals from the particular radio station, and tuning knob 1855 may adjust the one or more parameters selecting the particular radio station. In some embodiments, at least one of volume knob 1853 and tuning knob 1855 may also function as an on-off button for device 1850. Moreover, in the example depicted in FIG. 18B, device 1850 includes a plurality of buttons, e.g., buttons 1857 and 1859, that store one or more parameters for selecting a particular radio station. In this manner, buttons 1857 and 1859 may store 'favorite' radio stations for a user of device 1850.

Although device 1600 of FIG. 16 is described as a device for user input, and devices 1700, 1800, and 1850 of FIGS. 17, 18A, and 19B are described devices for content broadcasting, one skilled in the art would recognize that each device may alternatively or concurrently function like the other. For example, at least one processor 1605 of device 1600 of FIG. 16 may execute one or more apps that facilitate consumption of a media program by a user of device 1600. Such apps may include, for example, apps for streaming movies (such as NetFlix), apps for streaming television (such as Hulu), apps for streaming radio programs (such as iHeartRadio), apps for streaming podcasts (such as Stitcher Radio), or the like. Similarly, device 1700 and/or cable box 1709 may execute one or more apps that use one or more GUIs to receive values input from the user in response to consumed content. For example, device 1700 may use remote 1705, a smartphone or tablet associated with the user, or the like to receive input values from the user.

Figure 19:
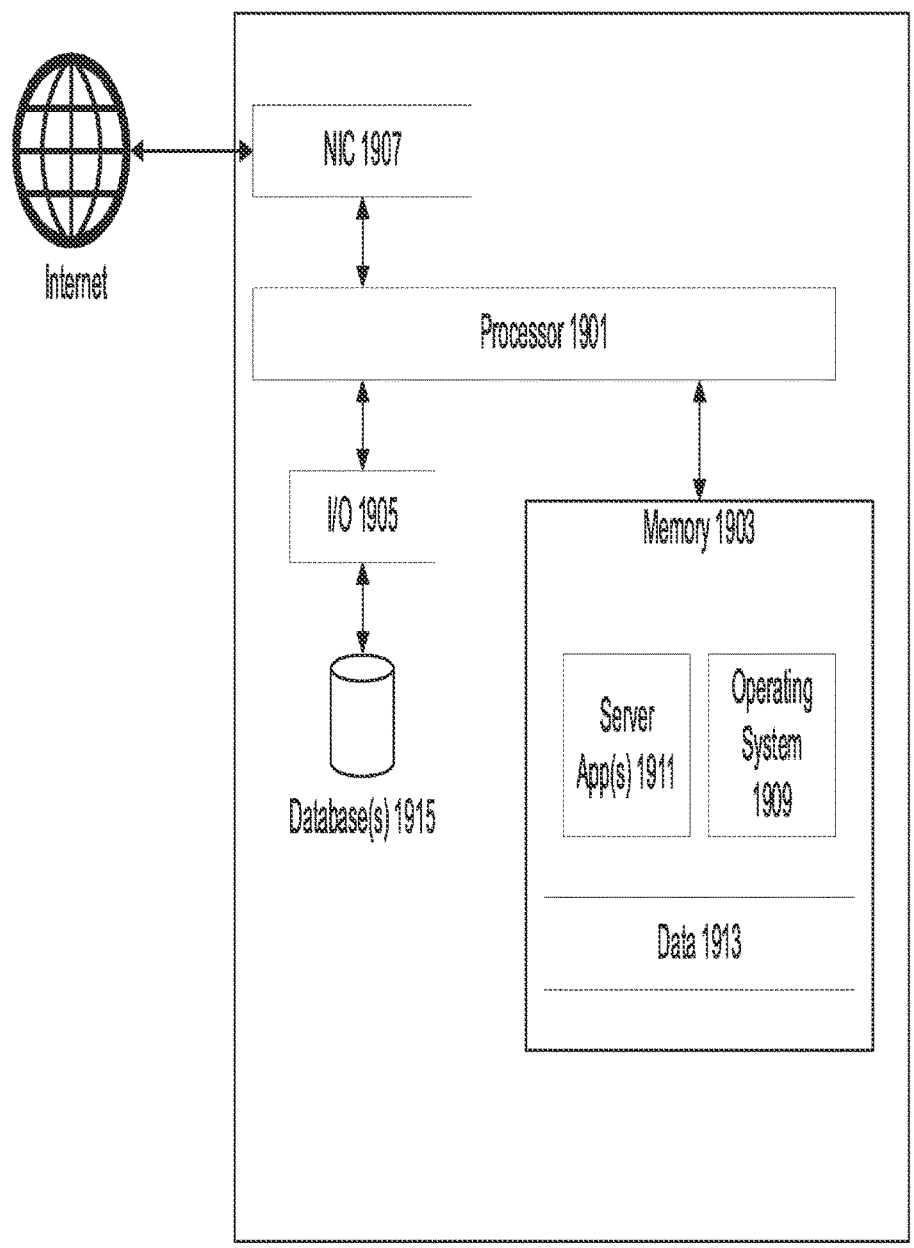
FIG. 19 is a depiction of an exemplary server for use by an input device and/or a content device, according to some embodiments of the present disclosure.

FIG. 19 is a depiction of exemplary server 1900 for use in receiving recorded values from a user device and correlating received values to live event schedules and/or predetermined time codes. As depicted in FIG. 19, server 1900 may have a processor 1901. Processor 1901 may comprise a single processor or a plurality of processors. As explained above, processor 1901 may comprise a CPU, a GPU, a reconfigurable array (e.g., an FPGA or other ASIC), or the like.

Processor 1901 may be in operable connection with a memory 1903, an input/output module 1905, and a network interface controller (NIC) 1907. Memory 1903 may comprise a single memory or a plurality of memories. In addition, memory 1903 may comprise volatile memory, non-volatile memory, or a combination thereof. As depicted in FIG. 19, memory 1903 may store one or more operating systems 1909 and one or more server applications 1911. In addition, memory 1903 may store data 1913 produced by, associated with, or otherwise unrelated to operating system 1909 and/or server applications 1911.

Input/output module 1905 may store and retrieve data from one or more databases 1915. For example, database(s) 1915 may store known audio codes and/or live event schedules consistent with the present disclosure. NIC 1907 may connect server 1900 to one or more computer networks. In the example of FIG. 19, NIC 1907 connects server 1900 to the Internet. Server 1900 may receive data and instructions over a network using NIC 1907 and may transmit data and instructions over a network using NIC 1907.

Processor 1901 may execute methods 1350 of FIG. 13B. Accordingly, server 1900 may, for example, manage a live analytics session with a client device (not shown). Additionally or alternatively, processor 1901 may receive data structures generated by a user device (not shown) according to methods 300, 500, 700, 900, 1100, 1300, and/or 1500 of FIGS. 3, 5, 7, 9, 11, 13A, and/or 15, respectively. Accordingly, processor 1901 may store such data structures in database(s) 1915 and/or provide such data structures to a client device (not shown).

The foregoing description has been presented for purposes of illustration. It is not exhaustive and is not limited to precise forms or embodiments disclosed. Modifications and adaptations of the embodiments will be apparent from consideration of the specification and practice of the disclosed embodiments.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

Instructions or operational steps stored by a computer-readable medium may be in the form of computer programs, program modules, or codes. As described herein, computer programs, program modules, and code based on the written description of this specification, such as those used by the processor, are readily within the purview of a software developer. The computer programs, program modules, or code can be created using a variety of programming techniques. For example, they can be designed in or by means of C, C++, Java, Verilog Hardware Description Language, VHSIC Hardware Description Language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for synchronizing a device to a live event using audio signals, the system comprising:
   at least one memory storing instructions; and
   at least one processor executing the instructions to cause the system to:
      initiate a live analytics session with a client device;
      receive, from a user device, recorded values input by a user of the user device along with corresponding time stamps related to at least one time code;
      receive, from a device associated with the live event, a schedule mapping the at least one time code to a corresponding time stamp;
      correlate the received recorded values with the received schedule based on the at least one time code; and
      push, in real-time, the correlated values to the client device.

* * * * *